United States Patent
Choi et al.

(10) Patent No.: US 9,729,279 B2
(45) Date of Patent: Aug. 8, 2017

(54) PACKET TRANSMISSION AND RECEPTION SYSTEM, APPARATUS, AND METHOD

(71) Applicant: ELECTRONICS AND TELECOMMUNICATIONS RESEARCH INSTITUTE, Daejeon (KR)

(72) Inventors: Yong Seok Choi, Daejeon (KR); Hyuk Je Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 97 days.

(21) Appl. No.: 14/800,603

(22) Filed: Jul. 15, 2015

(65) Prior Publication Data

US 2016/0065331 A1    Mar. 3, 2016

(30) Foreign Application Priority Data

Aug. 26, 2014  (KR) ........................ 10-2014-0111596

(51) Int. Cl.
| | |
|---|---|
| G06F 11/00 | (2006.01) |
| H03M 13/00 | (2006.01) |
| H04L 1/18 | (2006.01) |
| G06F 11/10 | (2006.01) |
| G06F 13/42 | (2006.01) |

(52) U.S. Cl.
CPC ........ *H04L 1/1858* (2013.01); *G06F 11/1004* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 5,905,769 A | 5/1999 | Lee et al. | |
| 7,370,132 B1* | 5/2008 | Huang | G06F 13/4018 710/305 |
| 7,756,123 B1* | 7/2010 | Huang | G06F 13/4022 370/359 |
| 8,116,311 B1* | 2/2012 | Kunz | H04L 47/36 370/389 |
| 8,761,209 B1* | 6/2014 | Brown | H04L 12/413 370/535 |
| 9,058,266 B2 | 6/2015 | Choi | |
| 2010/0083066 A1* | 4/2010 | Sivaramakrishnan | G06F 13/4295 714/748 |
| 2010/0162033 A1 | 6/2010 | Ahn et al. | |

(Continued)

FOREIGN PATENT DOCUMENTS

| | | |
|---|---|---|
| KR | 10-2000-0010832 A | 2/2000 |
| KR | 10-2003-0040603 A | 5/2003 |

*Primary Examiner* — Daniel McMahon

(57) ABSTRACT

Provided are a packet transmission and reception system, apparatus, and method. The packet transmission and reception system for distributing and transmitting data through a plurality of multi-lanes includes a first transmission and reception apparatus configured to include a plurality of first physical lanes and a plurality of first logical lanes connected to the plurality of first physical lanes, and a second transmission and reception apparatus configured to include a plurality of second physical lanes and a plurality of second logical lanes connected to the plurality of second physical lanes.

20 Claims, 23 Drawing Sheets

(56) References Cited

U.S. PATENT DOCUMENTS

| | | | | |
|---|---|---|---|---|
| 2011/0255865 A1* | 10/2011 | Brooks | ................... | H04L 1/203 |
| | | | | 398/27 |
| 2013/0002396 A1* | 1/2013 | Sato | ....................... | H04L 25/14 |
| | | | | 340/2.1 |
| 2015/0278040 A1* | 10/2015 | Sikkink | ............... | G06F 11/2002 |
| | | | | 714/5.1 |
| 2016/0020978 A1* | 1/2016 | Giannakopoulos | ..... | H04L 43/12 |
| | | | | 370/252 |

* cited by examiner

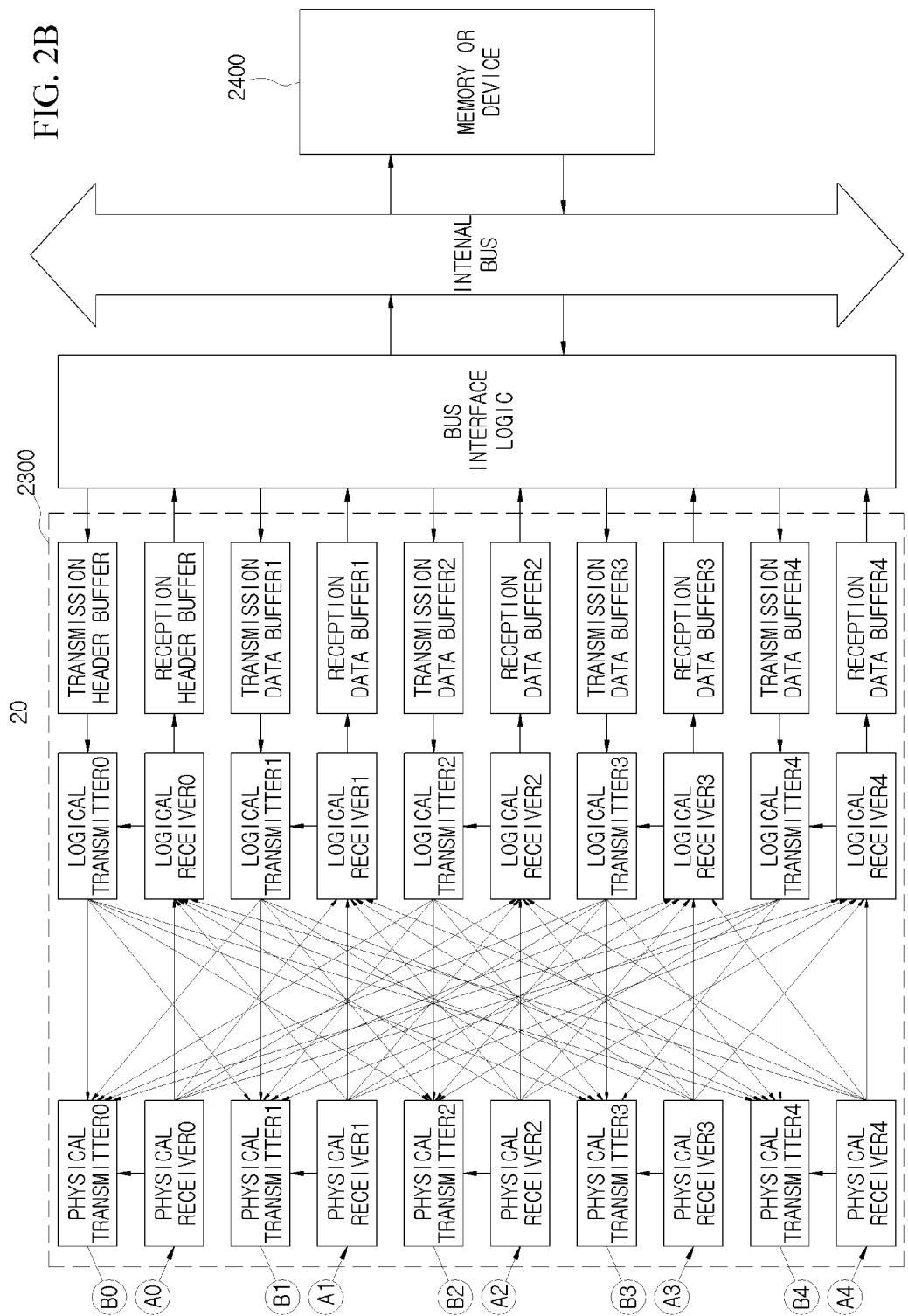

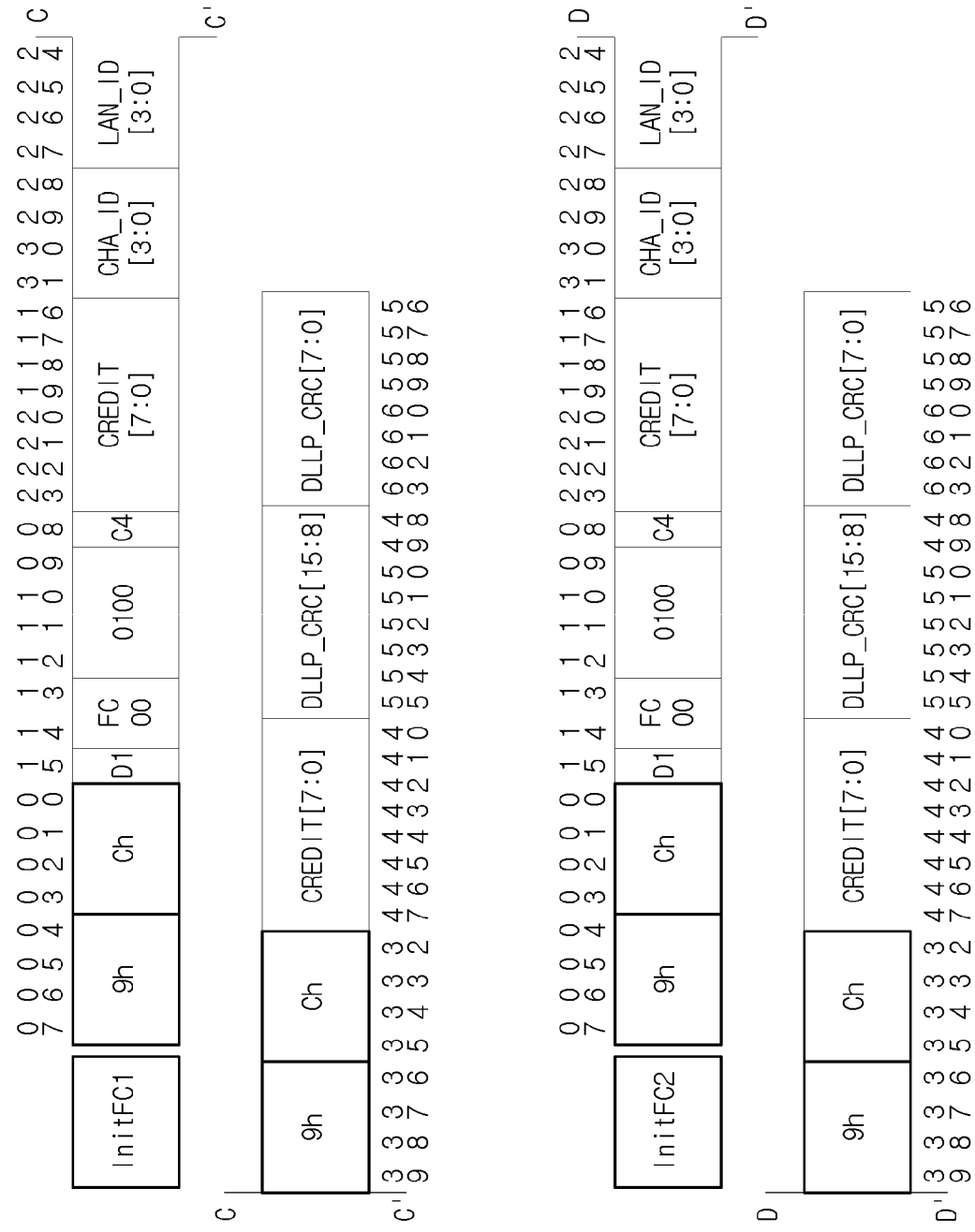

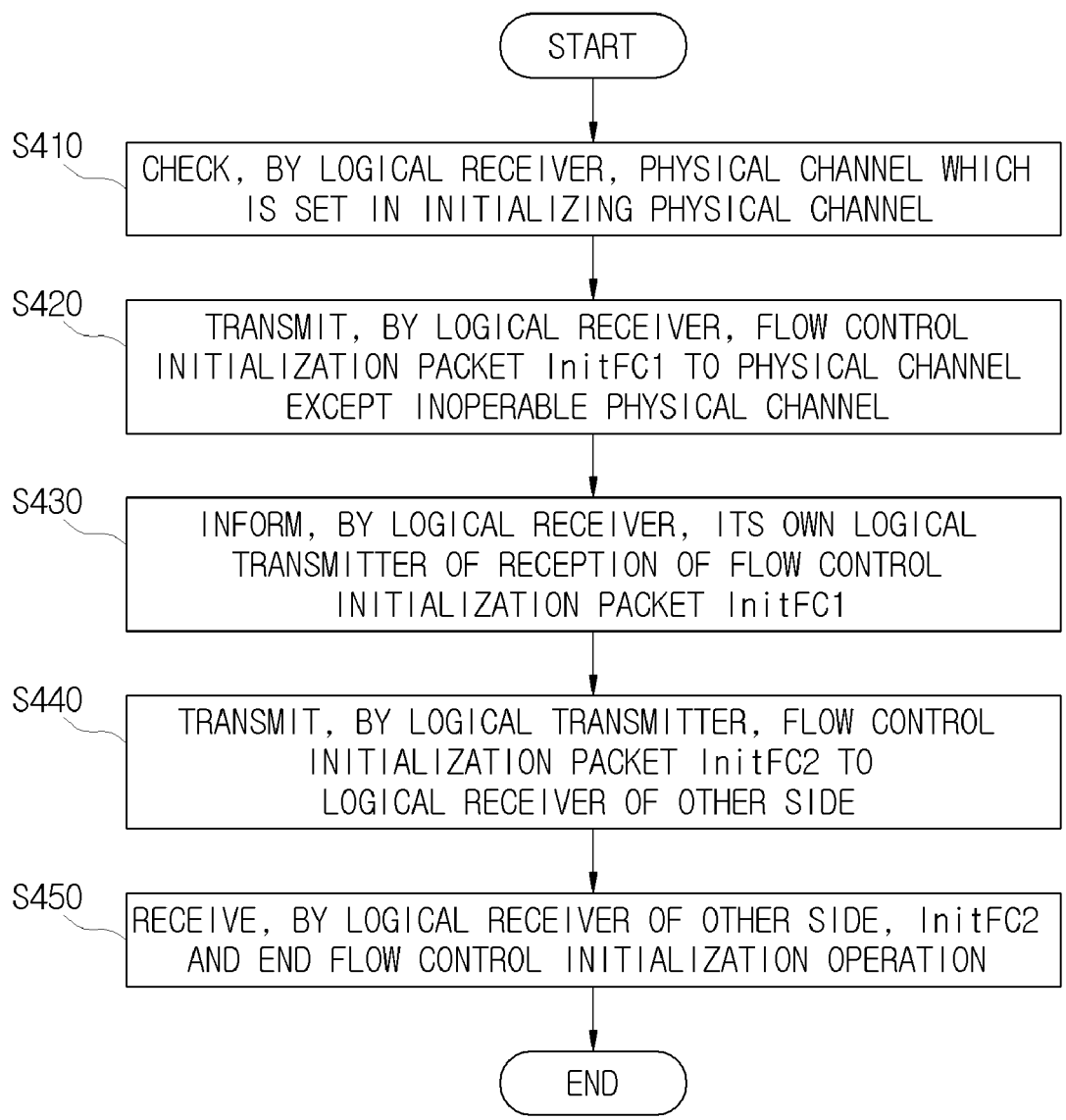

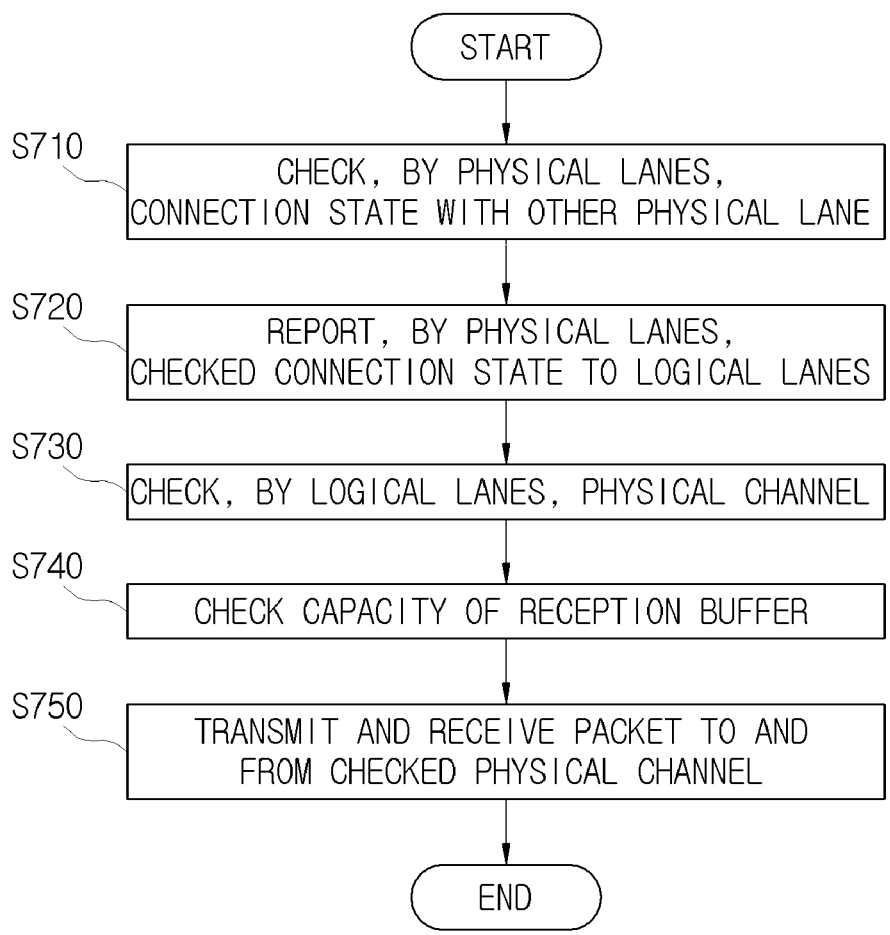

PACKET TRANSMISSION AND RECEPTION SYSTEM, APPARATUS, AND METHOD

CROSS-REFERENCE TO RELATED APPLICATIONS

This application claims priority under 35 U.S.C. §119 to Korean Patent Application No. 10-2014-0111596, filed on Aug. 26, 2014, the disclosure of which is incorporated herein by reference in its entirety.

TECHNICAL FIELD

The present invention relates to a packet transmission and reception technique, and more particularly, to a packet transmission and reception system, apparatus, and method using a multi-lane.

BACKGROUND

Generally, in packet-based high speed serial communication, a multi-lane is used for expanding a total bandwidth, and one packet is distributed to a plurality of lanes and transmitted.

For example, a packet format of the peripheral component interconnect (PCI) express protocol is as illustrated in FIG. 1A, and when a computer transmits the PCI express packet distributed to a quadruple lane, the PCI express packet is transmitted and received in a format illustrated in FIG. 1B.

However, when data is distributed by lanes and transmitted, a skew between the lanes occurs due to an electrical characteristic and interference, and thus, the order where the distributed data reaches a destination is changed.

To solve such a problem, a related art receiver uses a logic which removes a skew between lanes and aligns a packet, for normally restoring the packet.

Moreover, the related art receiver cannot restore for itself a packet where a skew occurs, and periodically receives, from a transmitter, a packet for inter-lane alignment for each lane.

In a related art method, the related art receiver recognizes one of a plurality of lanes as a reference lane and aligns data, which precedes or succeeds the reference lane, in a buffer which is provided for each lane, thereby restoring a normal packet.

However, in the related art method, when a data skew deviates from a depth of the buffer for each lane, all lanes are put in an incommunicable state, and thus, it is required to again initialize all the lanes. For this reason, a data packet cannot be transmitted and received for a considerable time.

In addition, when one of lanes other than the reference lane is permanently put in an inoperable state due to a fault, available lanes cannot be sometimes used despite all the lanes being initialized.

For example, a device which uses a PCI express link (where the link is a unit where a packet is transmitted and received by using all lanes) consisting of four lanes 0 to 3 will now be described. When the lane 3 of the device is permanently put in an inoperable state, despite the lanes 0 to 2 being available, only two the lanes 0 and 1 are used. Also, when the lane 2 is permanently put in an inoperable state, despite the lanes 0, 1 and 3 being available, only the two lanes 0 and 1 are used. Likewise, when the lane 1 is permanently put in an inoperable state, despite the lanes 0, 2 and 3 being available, only one the lane 0 is used. Also, when the lane 0 which is a reference lane is permanently put in an inoperable state, despite the lanes 1 to 3 being available, all the lanes cannot be used, and for this reason, an overall system is sometimes stopped.

Therefore, the related art method is not suitable for, particularly, a system requiring high availability.

Moreover, in a related art transmission and reception apparatus, normal operations of two devices which access each other are ensured when the same lanes access each other. In detail, in a high speed serial communication link consisting of four lanes 0 to 3, a normal operation is ensured when the lane 0 accesses a correspondent lane 0, the lane 1 accesses a correspondent lane 1, the lane 2 accesses a correspondent lane 2, and the lane 3 accesses a correspondent lane 3.

SUMMARY

Accordingly, the present invention provides a packet transmission and reception system, apparatus, and method, which transmit and receive a packet through a multi-lane interface.

The object of the present invention is not limited to the aforesaid, but other objects not described herein will be clearly understood by those skilled in the art from descriptions below.

In one general aspect, a packet transmission and reception system for distributing and transmitting data through a plurality of multi-lanes includes: a first transmission and reception apparatus configured to include a plurality of first physical lanes and a plurality of first logical lanes connected to the plurality of first physical lanes; and a second transmission and reception apparatus configured to include a plurality of second physical lanes and a plurality of second logical lanes connected to the plurality of second physical lanes, wherein each of the plurality of first physical lanes checks a second physical lane connected thereto among the plurality of second physical lanes and informs the plurality of first logical lanes of information about the checked second physical lane, and each of the plurality of first logical lanes checks first and second physical lanes which are connected to a second logical lane corresponding to each first logical lane among the plurality of second logical lanes, based on the information and transmits or receives a data packet to or from the corresponding second logical lane through the checked first and second physical lanes.

Each of the plurality of first and second physical lanes may include a physical transmitter and a physical receiver, and each of the plurality of first and second logical lanes may include a logical transmitter and a logical receiver.

The plurality of first logical lanes may check the information, and before transmitting or receiving the data packet, the plurality of first logical lanes may transmit a flow control packet, indicating a capacity of a transmission and reception buffer included in each of the plurality of first logical lanes, to the plurality of second logical lanes.

The plurality of first logical lanes may transmit a flow control update packet indicating the capacity of the transmission and reception buffer which has been changed after the flow control packet is transmitted.

Each of the plurality of second physical lanes may check a first physical lane connected thereto among the plurality of first physical lanes and informs the plurality of second logical lanes of information about the checked first physical lane, and each of the plurality of second logical lanes may autonomously check first and second physical lanes which are connected to a first logical lane corresponding to each second logical lane among the plurality of first logical lanes, based on the information and may transmit or receive a data packet to or from the corresponding first logical lane through the autonomously checked first and second physical lanes.

When a first physical lane which is not connected to one of the plurality of second physical lanes or is inoperable is checked from among the plurality of first physical lanes, the plurality of first logical lanes may transmit or receive the data packet to or from the plurality of second logical lanes by using a first physical lane except the checked first physical lane.

When the data packet distributed to and transmitted through the plurality of multi-lanes is received from the plurality of second logical lanes through at least one of the plurality of first physical lanes and at least one of the plurality of second physical lanes, the plurality of first logical lanes may check a combination sequence of the data packet by using a payload sequence included in the data packet and combine the data packet according to the combination sequence to restore original data.

When the first transmission and reception apparatus is a host apparatus, the second transmission and reception apparatus may be a device which is connected to the host apparatus through an external interface.

In another general aspect, a packet transmission and reception apparatus for transmitting and receiving data to and from another apparatus connected to an external interface through a multi-lane includes: a plurality of physical transmitters configured to correspond to number of multi-lanes; a plurality of physical receivers configured to correspond to the plurality of physical transmitters in a one-to-one correspondence relationship; a plurality of logical transmitters configured to correspond to the number of the multi-lanes; and a plurality of logical receivers configured to correspond to the plurality of logical transmitters in a one-to-one correspondence relationship, wherein when at least one of an inoperable physical transmitter and an inoperable physical receiver is checked from among the plurality of physical transmitters and the plurality of physical receivers, at least one of the plurality of logical transmitters and the plurality of logical receivers transmits or receives a data packet to or from the other apparatus by using another physical transmitter and another physical receiver except a physical transmitter and a physical receiver which correspond to the at least one of the inoperable physical transmitter and the inoperable physical receiver.

Each of the plurality of logical receivers or a module which has received the data packet from the plurality of logical receivers may check a payload sequence included in the data packet to identify a header packet, corresponding to the data packet, and a packet combined with the data packet.

Each of the plurality of logical receivers or a module which has received the data packet from the plurality of logical receivers may check a payload sequence of a data payload packet in the data packet to check a combination sequence of the data packet and a packet combined with the data packet, and combine the data packet with the combined packet according to the combination sequence.

Each of the plurality of physical receivers may receive a training sequence packet from a plurality of other physical transmitters included in the other apparatus to initialize a physical channel with each of the plurality of other physical transmitters, and transfer information of the initialized physical channel to the plurality of logical receivers.

In another general aspect, a packet transmission and reception method, where a first transmission and reception apparatus including a plurality of physical lanes and a plurality of logical lanes transmits or receives a packet to or from a second transmission and reception apparatus including a plurality of other physical lanes and a plurality of other logical lanes, includes: checking, by the plurality of physical lanes, a connection state with each of the plurality of other physical lanes; informing, by the plurality of physical lanes, the plurality of logical lanes of the checked connection state; checking, by each of the plurality of logical lanes, a physical channel for transmitting or receiving a packet to or from the plurality of other logical lanes, based on the connection state; and transmitting or receiving, by each of the plurality of logical lanes, the packet to or from other logical lane, corresponding thereto among the plurality of other logical lanes, through the physical channel.

Other features and aspects will be apparent from the following detailed description, the drawings, and the claims.

BRIEF DESCRIPTION OF THE DRAWINGS

FIG. 2A and FIG. 2B are block diagram illustrating a packet transmission and reception system according to an embodiment of the present invention.

FIG. 4A illustrates a structure of a flow control initialization packet according to an embodiment of the present invention.

FIG. 4B is a flowchart illustrating a flow control initialization method based on ⓒ connection structure according to an embodiment of the present invention.

FIG. 7 is a flowchart illustrating a packet transmission and reception method according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
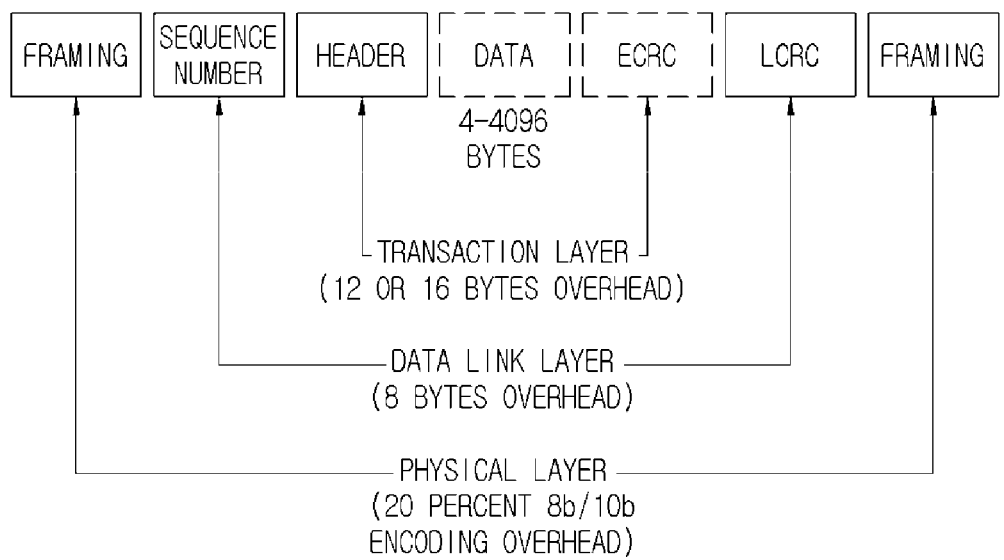
FIG. 1A illustrates a packet format of the PCI express packet.
Figure 1B:
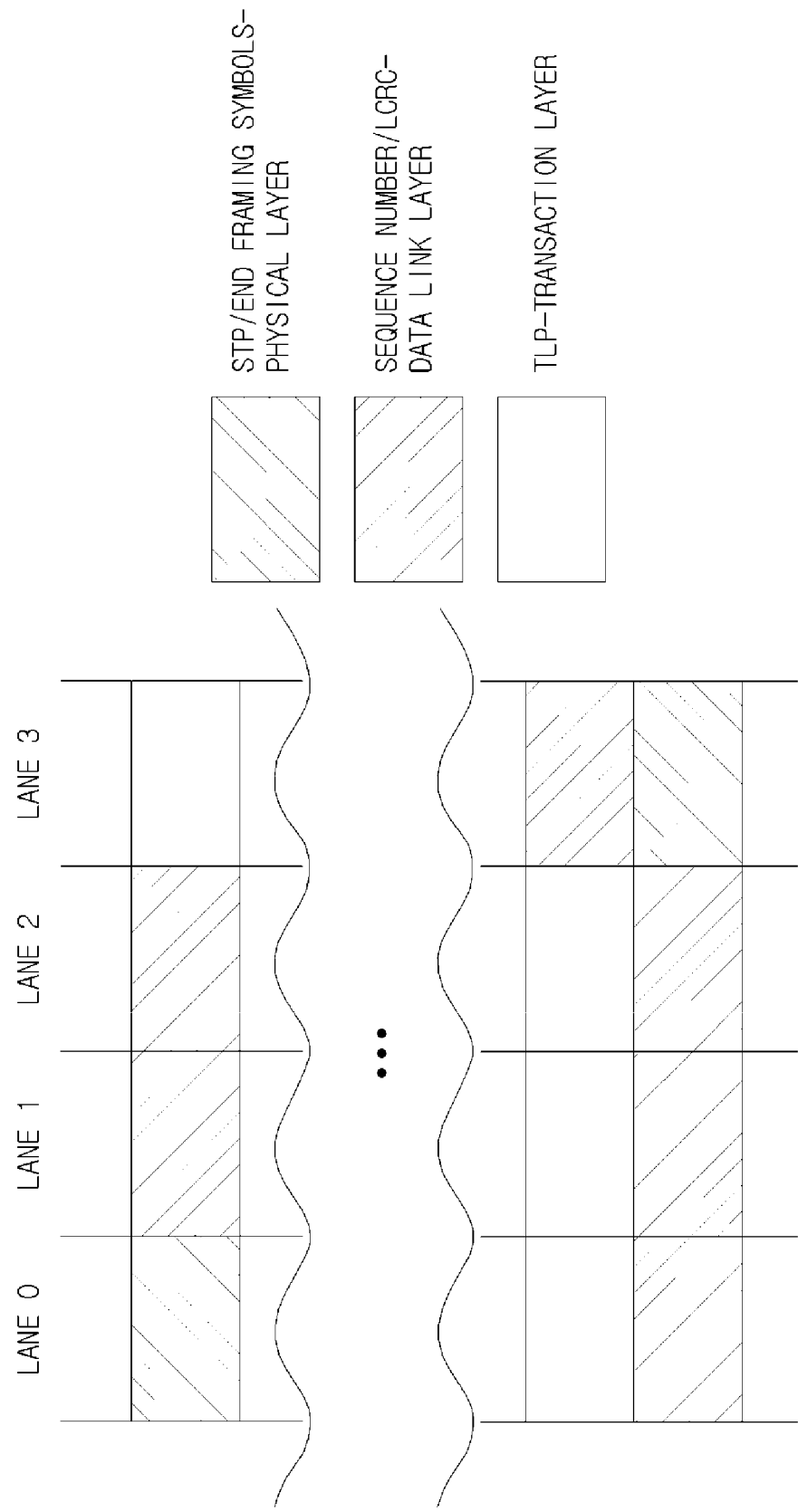
FIG. 1B illustrates an example where the PCI express packet is distributed to a quadruple lane and transmitted.
Figure 2A:
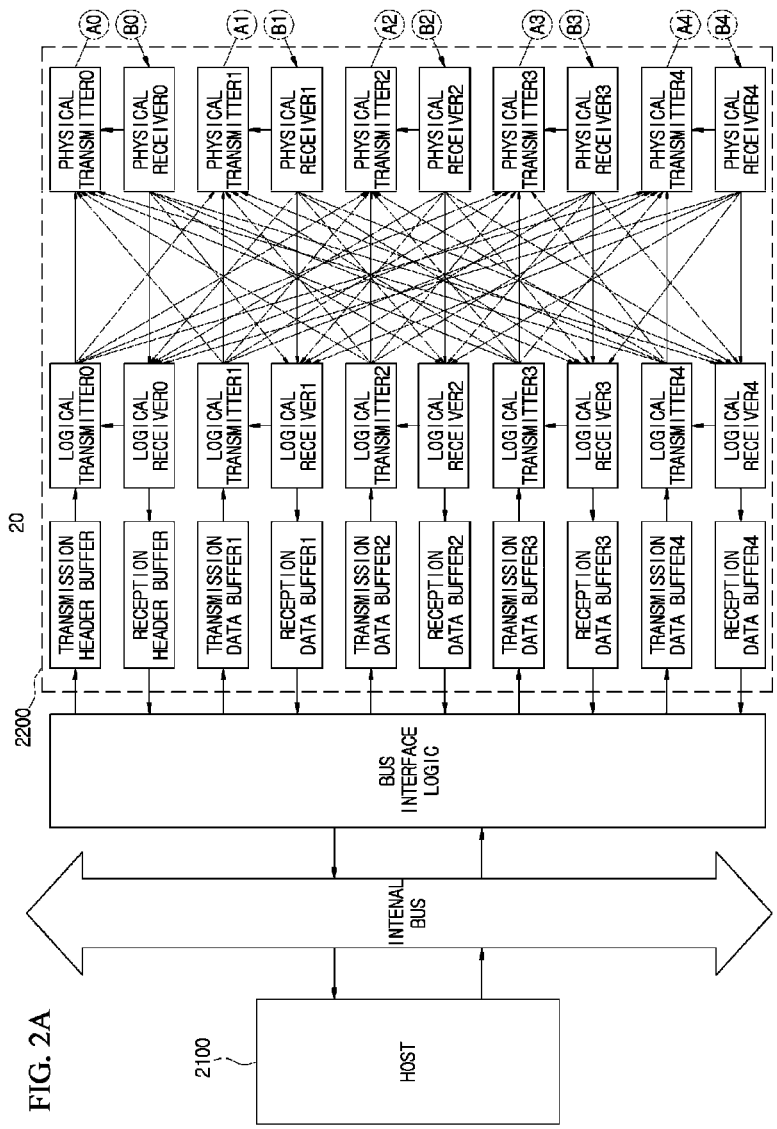

Hereinafter, embodiments of the present invention will be described in detail with reference to the accompanying drawings. FIG. 2A and FIG. 2B are block diagram illustrating a packet transmission and reception system 20 according to an embodiment of the present invention.

As illustrated in FIG. 2A and FIG. 2B, the packet transmission and reception system 20 according to an embodiment of the present invention includes a host transmission and reception apparatus 2200 and a device transmission and reception apparatus 2300.

In FIG. 2A and FIG. 2B, a case where the host transmission and reception apparatus 2200 transmits and receives a packet by using a quintuplex lane including one header lane through which the device transmission and reception apparatus 2300 transmits and receives a header packet and four data lanes through which the device transmission and reception apparatus transmits and receives a data packet will be described as an example.

Here, a host 2100 may be an apparatus that performs a function of a host such as a central processing unit (CPU). Also, a device may be a memory such as a random access memory (RAM) or may be another device which transmits and receives data to and from the host transmission and reception apparatus 2200 by using an interface link. In this case, the interface link may be a PCI interface, and the device transmission and reception apparatus 2300 may be an apparatus which is mounted on a PCI slot.

For example, when the host 2100 is a CPU where a cache line is 64 bits, all data lanes may transmit and receive data of total 512 bits (64×8) in an one-time data transmission and reception operation, and each of the data lanes may transmit and receive a 128-bit (512/4) data packet.

The host transmission and reception apparatus 2200 may include one transmission header buffer, one reception header buffer, four transmission data buffers, four reception data buffers, five logical transmitters, five logical receivers, five physical lane transmitters, and five physical lane receivers. The host transmission and reception apparatus 2200 may be included in the host 2100 or may be provided as a separate apparatus different from the host 2100.

The device transmission and reception apparatus 2300 may include one transmission header buffer, one reception header buffer, four transmission data buffers, four reception data buffers, five logical transmitters, five logical receivers, five physical lane transmitters, and five physical lane receivers. The device transmission and reception apparatus 2300 may be included in a device 2400 or may be provided as a separate apparatus different from the device 2400.

The host transmission and reception apparatus 2200 and the device transmission and reception apparatus 2300 may each perform ① physical channel setting operation, ② flow control initialization operation, and ③ data packet transmission and reception operation.

As described above, in an embodiment of the present invention, a plurality of logical lanes and a plurality of physical lanes may be provided, and each of the lanes may independently transmit and receive a packet.

Therefore, in an embodiment of the present invention, a logical lane may be mapped to an arbitrary physical lane, and thus, a degree of coupling freedom between a logical lane and a physical lane increases. Also, arbitrary access between physical lanes may be allowed, and thus, each lane is efficiently used.

Moreover, in an embodiment of the present invention, even when an error occurs in some physical lanes, other available physical lanes are used, and thus, availability is high. Particularly, the present invention is useful for a system requiring high availability.

In addition, in an embodiment of the present invention, a lane is freely set, and thus, a degree of access freedom for cables in addition to printed circuit board (PCB) routing is enhanced. Therefore, according to an embodiment of the present invention, lanes are easily arranged even when each lane is constructed in an edge finger form like a PCI express card, a plurality of lanes are bundled in a 10G QSFP type or a PCI express cable type, or a plurality of lanes are arranged in disorder.

Hereinafter, functional blocks of the host transmission and reception apparatus 2200 and the device transmission and reception apparatus 2300 will be described in more detail with reference to FIGS. 2 and 3A to 6B.

① Physical Channel Setting Operation

TS Packet Structure

Figure 3A:
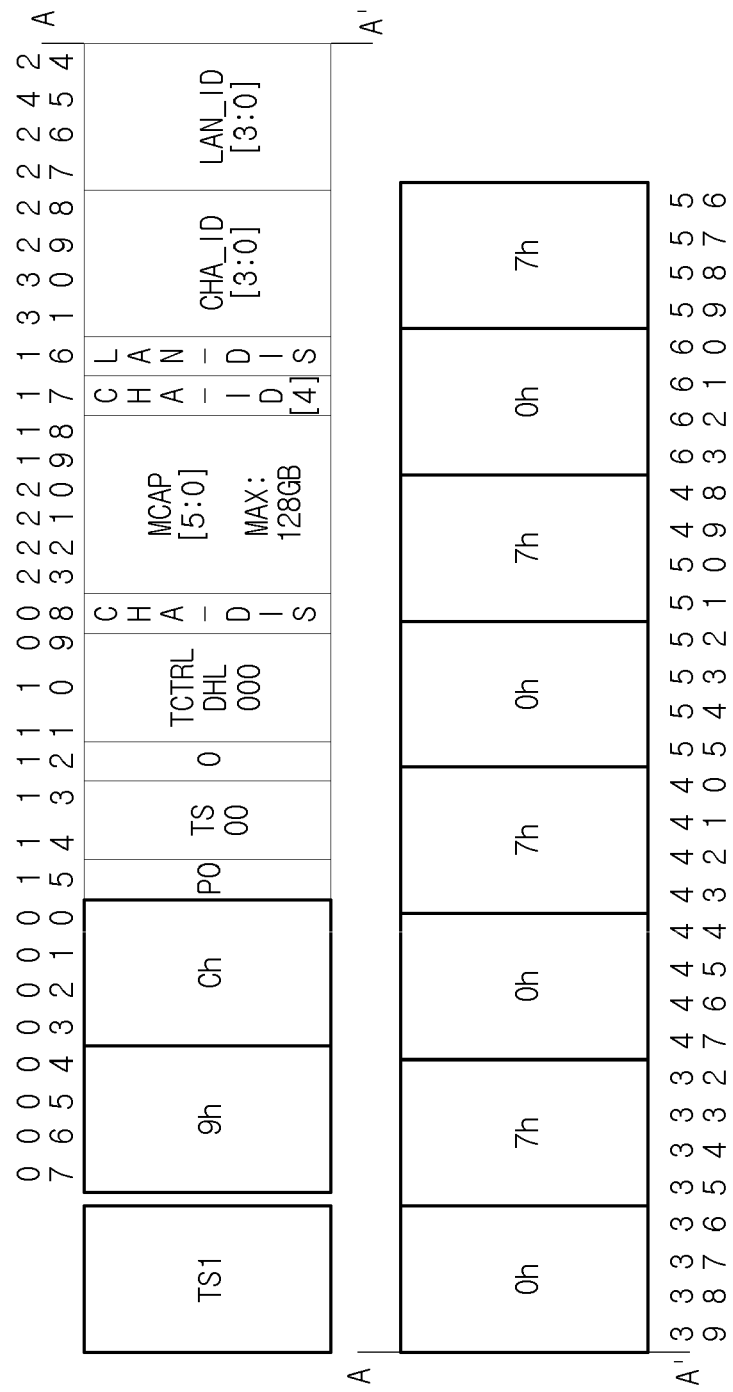
FIGS. 3A and 3B illustrate a packet structure for channel link establishment according to an embodiment of the present invention.
Figure 3B:
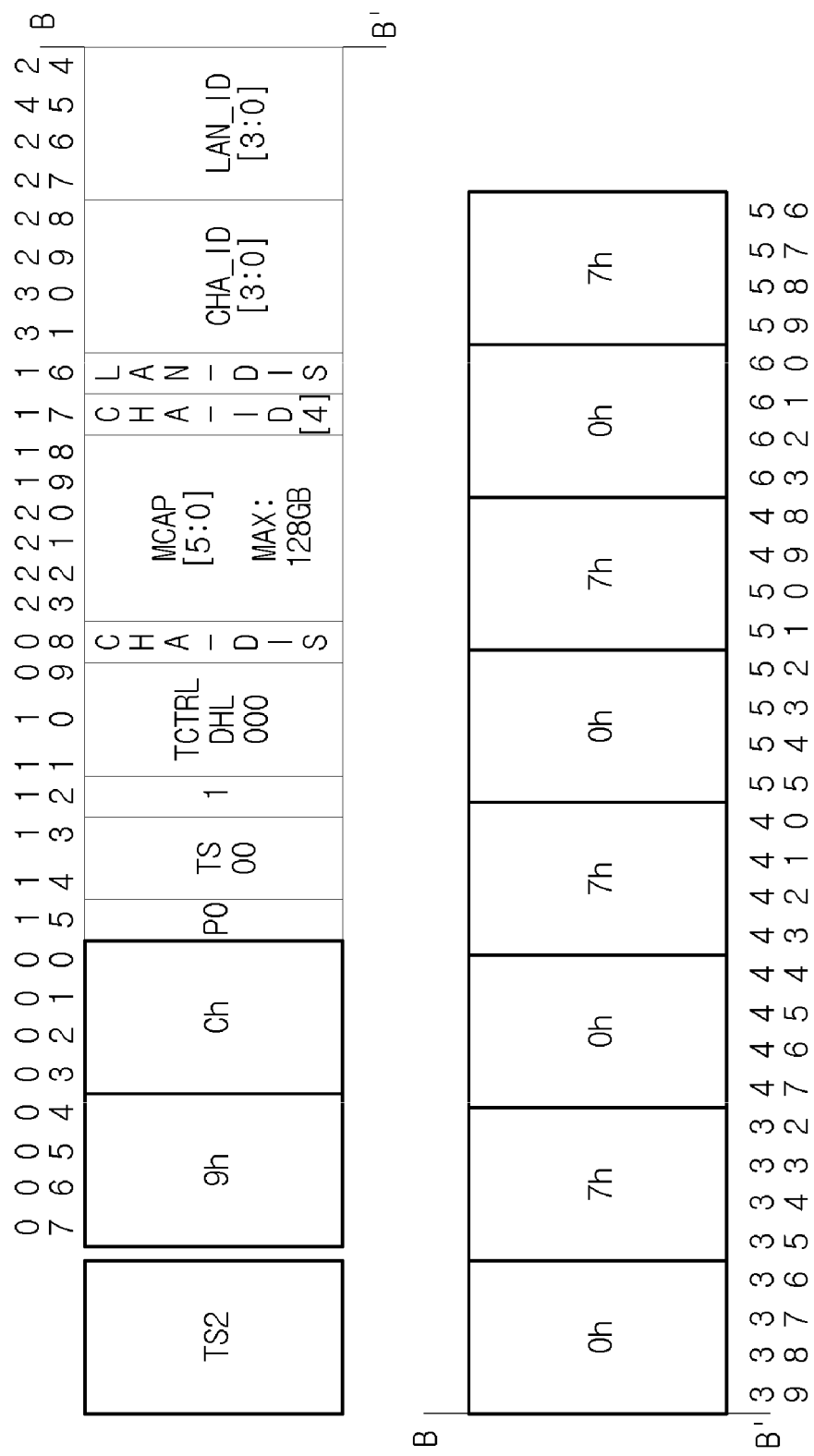

First, TS1 and TS2 packets which are transmitted and received by the physical lane transmitters and receivers of the host transmission and reception apparatus 2200 and the device transmission and reception apparatus 2300 in a channel link establishment operation will be described with reference to FIG. 3A and FIG. 3B. FIG. 3A and FIG. 3B illustrate a packet structure for channel link establishment according to an embodiment of the present invention.

Here, TS is an abbreviation for Training Sequence and denotes a training sequence for channel link establishment. In this case, TS1 may be used for initial link establishment, and TS2 may be used for link establishment check. A TS packet may include a control symbol (see a block thickly illustrated in FIG. 3A and FIG. 3B) and a data symbol (see a block thinly illustrated in FIG. 3A and FIG. 3B) for packet framing. Here, each bit may be constructed in units of an 8-bit symbol, and thus, respective bits of the TS1 and TS2 packets may be illustrated as 7-0, 15-8, 23-16, 31-24, 39-32, 47-40, 55-48, and 63-56 in a transmission sequence. Packets subsequent thereto may be similarly illustrated.

As illustrated in FIG. 3A and FIG. 3B, the TS1 and TS2 packets may have a type where the TS1 and TS2 packets start with a control symbol "0x9C", three information bytes subsequent thereto are provided, and four control symbols "0x07" subsequent thereto are continuously provided. Here, 0x9C may denote a start of the TS packet, and four continuous 0x07s may denote an end of the TS packet. Hereinafter, a setting of each field of the TS1 and TS2 packets will be described.

A value representing whether a packet is a physical packet may be set in a bit 15 and P field of the TS packet. For example, when the P field is set to 0, the P field may represent that a corresponding packet is a physical packet, and when the P field is set to 1, the P field may represent that a corresponding packet is a logical packet. In this case, the setting may be made vice versa.

An identifier representing that a corresponding packet is the TS packet may be set in bits 14-13 and a TS field of the TS packet. For example, when the TS field of the TS packet is set to 00, the TS field may represent that a corresponding packet is the TS packet.

A bit 12 of the TS packet may include an identifier for identifying the TS1 packet and the TS2 packet. For example, when the bit 12 of the TS packet is a value "0", a corresponding packet may be TS1, and when the bit 12 of the TS packet is a value "1", a corresponding packet may be TS2. In this case, the setting may be made vice versa.

Bits 11-9 and a Tctrl field of the TS packet may include a value for performing functions such as channel disable, hot reset, and loop back. Generally, the value of the Tctrl field may not be used for a normal operation, but may be used for reducing power, maintaining a system, and performing a test.

A bit 8 and CHA_DIS field of the TS packet may include a bit for determining whether there is a host channel before giving a host channel number. For example, the CHA_DIS field may be set to 1 before initial power is applied and then a host channel is set, and may be set to 0 after existence of a channel is checked. In this case, the setting may be made vice versa.

Bits 23-18 and an MCAP[5:0] field of the TS packet may be a field representing a capacity of a memory/device. Here, the MCAP field may be used for a transmission and reception logic, accessing the memory/device (a second transmission and reception apparatus), to inform a host of the capacity of the memory/device.

For example, each bit of the MCAP field may denote a multiple of storage unit of the memory/device. In more detail, in a case where the storage unit is 2 GB, when a bit value of the MCAP field is 000000b, this may represent that a storage capacity is 2 GB, and when the bit value of the MCAP field is 000001b, this may represent that the storage capacity is 4 GB (=2 GB×2). Also, when the bit value of the MCAP field is 111111b, this may represent that the storage capacity is 128 GB (=2GB×2×2×2×2×2×2).

A bit 17 and bits 31-18 (i.e., total five bits) of the TS packet may be a field representing a channel identifier (ID). Here, the channel ID field may consist of total five bits, and thus, the TS packet may designate total 32 channel IDs by using a corresponding field. For example, when the host transmission and reception apparatus 2200 transmits and receives data to and from a plurality of the device transmission and reception apparatuses 2300 which are respectively connected to a plurality of interfaces (an internal but in FIG. 2), each device may check a packet transmitted from the host transmission and reception apparatus 2200 by using a channel ID of the packet. For example, when the host transmission and reception apparatus 2200 communicates with two devices which are respectively inserted into two PCI slots, each device may check a channel ID from a corresponding packet to identify the corresponding packet transmitted thereto.

A bit 16 and LAN_DIS field of the TS packet may be a field which is used to determine whether there is a physical lane (or a channel). For example, the LAN_DIS field may be set to 1 before initial power is applied and then a physical channel is set, and after the physical channel is set, the LAN_DIS field may be set to 0. In this case, the setting may be made vice versa.

LAN_ID[3:0] of bits 27-24 of the TS packet is a field for giving a lane number and consists of total 4 bits. Therefore, total sixteen lane numbers may be set.

In FIG. 3A and FIG. 3B, a case where the host transmission and reception apparatus 2200 and the device transmission and reception apparatus 2300 interface each other by using a high speed link through which data is transmitted and received in units of 64 bits with respect to 10GBase-R will be described as an example. Therefore, a TS1 packet structure and a TS2 packet structure illustrated in FIG. 3A and FIG. 3B may be constructed based on a protocol which allows data to be transmitted and received in units of 64 bits at 10GBase-R. However, a structure of a TS packet may be constructed in another format by an implementer. Likewise, the host transmission and reception apparatus 2200 and the device transmission and reception apparatus 2300 may be constructed in another format when the host transmission and reception apparatus 2200 and the device transmission and reception apparatus 2300 are based on a high speed serial protocol different from 10GBase-R. In the present specification, for convenience of a description, a case where the host transmission and reception apparatus 2200 and the device transmission and reception apparatus 2300 interface each other by using the high speed link through which data is transmitted and received in units of 64 bits with respect to 10GBase-R has been described above as an example.

Physical Lane Initialization Operation

Figure 3C:
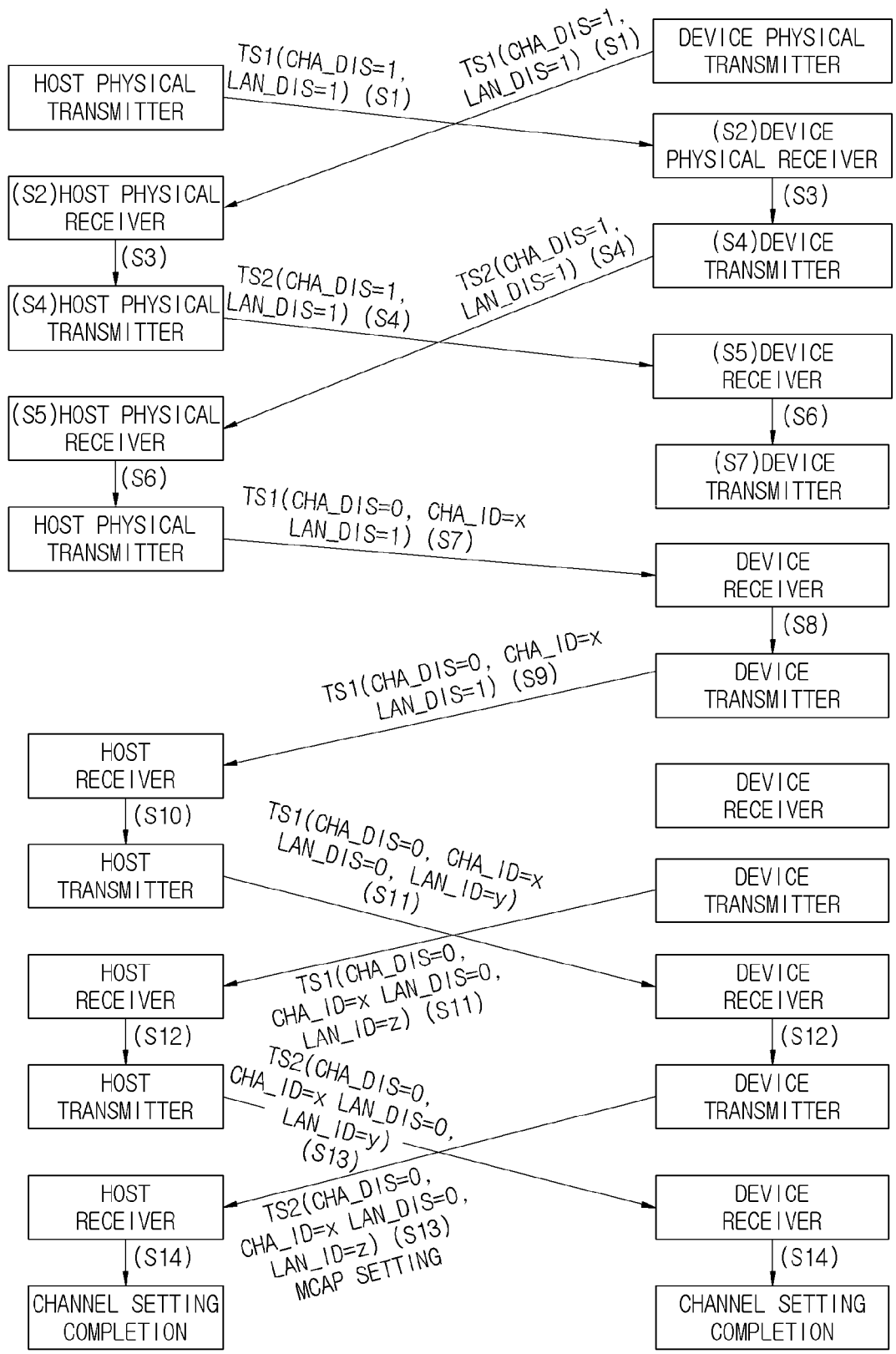
FIG. 3C is a flowchart illustrating a physical channel initialization operation according to an embodiment of the present invention.

Hereinafter, an operation where each physical lane transmitter/receiver of each of the host transmission and reception apparatus 2200 and the device transmission and reception apparatus 2300 initializes a physical channel by using the TS1 and TS2 packets will be described in detail. FIG. 3C is a flowchart illustrating a physical channel initialization operation according to an embodiment of the present invention.

The physical lane transmitter/receiver of the host transmission and reception apparatus 2200 may access the physical lane transmitter/receiver of the device transmission and reception apparatus 2300, and when power is applied to the host transmission and reception apparatus 2200 and the device transmission and reception apparatus 2300 (hereinafter referred to as an initial state), each physical lane (or each physical channel) may be set as follows. In this case, each physical lane transmitter/receiver of each of the host transmission and reception apparatus 2200 and the device transmission and reception apparatus 2300 may be mapped to a correspondent lane transmitter/receiver connected thereto in a one-to-one correspondence relationship.

Hereinafter, for convenience of a description, each physical lane transmitter/receiver of the host transmission and reception apparatus 2200 may be referred to as a host physical transmitter/receiver, and each physical lane transmitter/receiver of the device transmission and reception apparatus 2300 may be referred to as a device physical transmitter/receiver.

In step 1, in the initial state, the host physical transmitter and the device physical transmitter may transmit a TS1 packet where a CHA_DIS field and a LAN_DIS field are set to 1, for checking whether there is a physical channel connected thereto.

In step 2, a device physical receiver and a host physical receiver may receive the TS1 packet where the CHA_DIS field and the LAN_DIS field are set to 1, and thus determine there to be a correspondent physical transmitter connected through an interface link.

In step 3, the device physical receiver and the host physical receiver may respectively transfer the TS1 packet to the device physical transmitter and the host physical transmitter which are their own physical transmitters. Therefore, the device physical receiver and the host physical receiver may respectively inform their own the physical transmitters that the correspondent physical transmitter connected through the interface link is sensed.

In step 4, when the TS1 packet where the CHA_DIS field and the LAN_DIS field are set to 1 is received, the device physical transmitter and the host physical transmitter may transmit, to the interface link, a TS2 packet where the CHA_DIS field and the LAN_DIS field are set to 1. Therefore, the device physical transmitter and the host physical transmitter may inform the other side that a correspondent physical transmitter is sensed.

In step 5, the host physical receiver and the device physical receiver may receive, through the interface link, the TS2 packet where the CHA_DIS field and the LAN_DIS field are set to 1. In step 6, the host physical receiver and the device physical receiver may inform the other side that the TS2 packet where the CHA_DIS field and the LAN_DIS field are set to 1 is received. In this case, the host physical receiver and the device physical receiver may respectively transfer the TS2 packet, where the CHA_DIS field and the LAN_DIS field are set to 1, to the host physical transmitter and the device physical transmitter.

When the TS2 packet being received is checked, the host physical transmitter may change and set the CHA_DIS field to 0 for setting a checked physical channel and transmit, to the interface link, a TS1 packet where a designated channel ID CHA_ID (x in FIG. 3B) is set in step 7. In this case, the host physical transmitter may autonomously check the channel ID CHA_ID, or request the channel ID CHA_ID from the host 2100 to check the channel ID CHA_ID.

In step 8, when the TS1 packet where the channel ID CHA_ID is set is received through the interface link, the device physical receiver may transfer the TS1 packet to the device physical transmitter.

In step 9, the device physical transmitter may transmit, to the host physical receiver, a TS1 packet where the CHA_DIS field is set to 0, an allocated channel ID is provided, and the LAN_DIS field is set to 0.

In step 10, when the TS1 packet where the CHA_DIS field is set to 0, the allocated channel ID is provided, and the LAN_DIS field is set to 0 is received, the host physical receiver may transfer the TS1 packet to the host physical transmitter. In this case, in step 10, the device physical receiver may transfer the TS1 packet to the device physical transmitter and then command the device physical transmitter to transmit a TS1 packet where LAN_ID is set.

In step 11, the host physical transmitter may transmit, through the interface link, a TS1 packet where the CHA_DIS field is set to 0, an allocated channel ID is provided, the LAN_DIS field is set to 0, and its own lane number (for example, LAN_ID=y) is set.

Likewise, in step 11, the device physical transmitter may also transmit, through the interface link, a TS1 packet where the CHA_DIS field is set to 0, an allocated channel ID is provided, the LAN_DIS field is set to 0, and its own lane number (for example, LAN_ID=z) is set.

In step 12, each host physical receiver and each device physical receiver may check lane numbers of a device physical transmitter and a host physical transmitter connected through the interface link and may inform the host physical transmitter and the device physical transmitter, which are their own physical transmitters, of the lane numbers.

In step 13, when a TS1 packet including CHA_ID and LAN_ID is received, the host physical transmitter and the device physical transmitter may transmit a TS2 packet where CHA_ID and LAN_ID are set. Here, when a device is a memory, the device physical transmitter may transmit a TS2 packet, where MCAP is set, to inform a memory capacity in step 13'.

In step 14, when a TS2 packet where a channel ID and a lane number are set is received, the host physical receiver and the device physical receiver may terminate the physical channel initialization operation.

When the physical channel initialization operation is terminated, each of a plurality of host physical transmitters may inform a plurality of host logical transmitters of information about a device physical receiver connected thereto. Also, each of a plurality of host physical receivers may inform a plurality of host logical receivers of information about a device physical receiver connected thereto. Therefore, a plurality of host logical transmitters/receivers may know physical channel information about all host physical transmitters/receivers.

Likewise, each of a plurality of device physical transmitters may inform a plurality of device logical transmitters of information about a host physical receiver connected thereto. Also, each of a plurality of device physical receivers may inform a plurality of device logical receivers of information about a host physical receiver connected thereto. Therefore, a plurality of device logical transmitters/receivers may know physical channel information about all device physical transmitters/receivers.

Through the above-described process, each host physical transmitter and each device physical transmitter may check a lane number of a physical receiver connected thereto and then transmit a packet to a physical receiver corresponding to the lane number.

Physical Channel Initialization Operation Based on General Connection Structure as Illustrated in FIG. 2

In FIG. 2A and FIG. 2B, a host physical transmitter 0 may be connected to a device physical receiver 0, a host physical transmitter 1 may be connected to a device physical receiver 1, a host physical transmitter 2 may be connected to a device physical receiver 2, a host physical transmitter 3 may be connected to a device physical receiver 3, and a host physical transmitter 4 may be connected to a device physical receiver 4. For reference, an arrow in FIG. 2A and FIG. 2B may be a movement path of a packet.

In FIG. 2A and FIG, a host physical receiver 0 may be connected to a device physical transmitter 0, a host physical receiver 1 may be connected to a device physical transmitter 1, a host physical receiver 2 may be connected to a device physical transmitter 2, a host physical receiver 3 may be connected to a device physical transmitter 3, and a host physical receiver 4 may be connected to a device physical transmitter 4.

In this case, the host physical receiver 0 may receive TS1 and TS2 packets, where a lane number is set to 0, from the device physical transmitter 0 and thus inform the host physical transmitter 0 that the host physical receiver 0 is connected to the device physical transmitter 0. Also, the host physical receiver 1 may receive TS1 and TS2 packets, where a lane number is set to 1, from the device physical transmitter 1 and thus inform the host physical transmitter 1 that the host physical receiver 1 is connected to the device physical transmitter 1. Also, the host physical receiver 2 may receive TS1 and TS2 packets, where a lane number is set to 2, from the device physical transmitter 2 and thus inform the host physical transmitter 2 that the host physical receiver 2 is connected to the device physical transmitter 2. Also, the host physical receiver 3 may receive TS1 and TS2 packets, where a lane number is set to 3, from the device physical transmitter 3 and thus inform the host physical transmitter 3 that the host physical receiver 3 is connected to the device physical transmitter 3. Also, the host physical receiver 4 may receive TS1 and TS2 packets, where a lane number is set to 4, from the device physical transmitter 4 and thus inform the host physical transmitter 4 that the host physical receiver 4 is connected to the device physical transmitter 4.

The device physical receivers 0 to 4 may respectively receive, from the host physical transmitters 0 to 4, TS1 and TS2 packets where a lane number is set to 0, TS1 and TS2 packets where a lane number is set to 1, TS1 and TS2 packets where a lane number is set to 2, TS1 and TS2 packets where a lane number is set to 3, and TS1 and TS2 packets where a lane number is set to 4, and thus may respectively inform the device physical transmitters 0 to 4 that the device physical receivers 0 to 4 are respectively connected to the host physical transmitters 0 to 4 in a one-to-one correspondence relationship.

Then, the host physical transmitter 0 may inform the host logical transmitters 0 to 4 that the host physical receiver 0 is connected to the device physical receiver 0, and the host physical transmitter 1 may inform the host logical transmitters 0 to 4 that the host physical receiver 1 is connected to the device physical receiver 1. Likewise, the host physical transmitter 2 may inform the host logical transmitters 0 to 4 that the host physical receiver 2 is connected to the device physical receiver 2, the host physical transmitter 3 may inform the host logical transmitters 0 to 4 that the host physical receiver 3 is connected to the device physical receiver 3, and the host physical transmitter 4 may inform the host logical transmitters 0 to 4 that the host physical receiver 4 is connected to the device physical receiver 4.

Through such a process, all the host logical transmitters 0 to 4 may know that the host physical receivers 0 to 4 are respectively connected to the device physical transmitters 0 to 4.

Moreover, the device physical transmitters 0 to 4 may inform the device logical transmitters 0 to 4 of information about a host physical transmitter connected to a physical receiver connected thereto. Therefore, all the device logical transmitters 0 to 4 may know that the device physical receivers 0 to 4 are respectively connected to the host physical transmitters 0 to 4 in a one-to-one correspondence relationship.

Physical Channel Initialization Operation Based on  Connection Structure Different from FIG. 2

| Host physical transmitter 0 - Device physical receiver 0 |
| Host physical transmitter 1 - Device physical receiver 3 |
| Host physical transmitter 3 - Device physical receiver 2 |
| Host physical transmitter 4 - Device physical receiver 0 |
| Device physical transmitter 0 - Host physical receiver 4 |
| Device physical transmitter 1 - Host physical receiver 0 |
| Device physical transmitter 2 - Host physical receiver 3 |
| Device physical transmitter 3 - Host physical receiver 1 |
| Device physical transmitter 4 - Host physical receiver 2 |

In this case, the host physical receivers 0 to 4 may respectively receive TS1 and TS2 packets, where LAN_ID is set, from the device physical transmitters 1, 3, 4, 2, and 0 and inform their own transmitters that the host physical receivers 0 to 4 are respectively connected to the device physical transmitters 1, 3, 4, 2, and 0 through a connection interface.

In detail, the host physical receiver 0 may receive TS1 and TS2 packets, where LAN_ID is set to 1, from the device physical transmitter 1 and thus inform the host physical transmitter 0 that the host physical receiver 0 is connected to the device physical transmitter 1. The host physical receiver 1 may receive TS1 and TS2 packets, where LAN_ID is set to 3, from the device physical transmitter 3 and thus inform the host physical transmitter 1 that the host physical receiver 1 is connected to the device physical transmitter 3. The host physical receiver 2 may receive TS1 and TS2 packets, where LAN_ID is set to 4, from the device physical transmitter 4 and thus inform the host physical transmitter 2 that the host physical receiver 2 is connected to the device physical transmitter 4. The host physical receiver 3 may receive TS1 and TS2 packets, where LAN_ID is set to 2, from the device physical transmitter 2 and thus inform the host physical transmitter 3 that the host physical receiver 3 is connected to the device physical transmitter 2. The host physical receiver 4 may receive TS1 and TS2 packets, where LAN_ID is set to 0, from the device physical transmitter 0 and thus inform the host physical transmitter 4 that the host physical receiver 4 is connected to the device physical transmitter 0.

Likewise, the device physical receivers 0 to 4 may respectively receive TS1 and TS2 packets, where LAN_ID is set, from the host physical transmitters 4, 0, 3, 1 and 2 and inform their own transmitters that the device physical receivers 0 to 4 are respectively connected to the host physical transmitters 4, 0, 3, 1, and 2 through the connection interface.

In detail, the device physical receiver 0 may receive TS1 and TS2 packets, where LAN_ID is set to 4, from the host physical transmitter 4 and thus inform the device physical transmitter 0 that the device physical receiver 0 is connected to the host physical transmitter 4. The device physical receiver 1 may receive TS1 and TS2 packets, where LAN_ID is set to 0, from the host physical transmitter 0 and thus inform the device physical transmitter 1 that the device physical receiver 1 is connected to the host physical transmitter 0. The device physical receiver 2 may receive TS1 and TS2 packets, where LAN_ID is set to 3, from the host physical transmitter 3 and thus inform the device physical transmitter 2 that the device physical receiver 2 is connected to the host physical transmitter 3. The device physical receiver 3 may receive TS1 and TS2 packets, where LAN_ID is set to 1, from the host physical transmitter 1 and thus inform the device physical transmitter 3 that the device physical receiver 3 is connected to the host physical transmitter 1. The device physical receiver 4 may receive TS1 and TS2 packets, where LAN_ID is set to 2, from the host physical transmitter 2 and thus inform the device physical transmitter 4 that the device physical receiver 4 is connected to the host physical transmitter 2.

Then, the host physical transmitters 0 to 4 may respectively inform the host logical transmitters 0 to 4 (which are their own logical transmitters) of information about the device physical transmitters 1, 3, 4, 2, and 0 respectively connected to their own physical receivers 0 to 4. Therefore, all the host logical transmitters 0 to 4 may know that the host physical receivers 0 to 4 are respectively connected to the device physical transmitters 1, 3, 4, 2, and 0.

Likewise, the device physical transmitters 0 to 4 may respectively inform the device logical transmitters (which are their own logical transmitters) of information about the host physical transmitters 4, 0, 3, 1, and 2 respectively connected to the device physical receivers 0 to 4 which are their own physical receivers. Therefore, all the device logical transmitters 0 to 4 may know that the device physical receivers are respectively connected to the host physical transmitters 4, 0, 3, 1, and 2.

Due to such a structure, even when an interface of a host does not match an interface of a device, data is normally transmitted and received.

 Flow Control Initialization Operation

When the physical channel initialization operation is terminated, a flow control initialization operation where a logical channel informs the other side of the amount of its own reception buffer may be performed. Therefore, according to the present embodiment, transmission of a packet may be induced only when a buffer of a receiving side is sufficient to receive the packet. Here, the logical channel may include a logical transmitter and a logical receiver.

Flow Control Initialization Packet

First, a structure of an initialization packet "InitFC" used to perform the flow control initialization operation will be described. FIG. 4A illustrates a structure of a flow control initialization packet according to an embodiment of the present invention.

Bits 7-0 of an InitFC packet may be set to 0x9C which is a control symbol representing a control packet.

A bit 15 of the InitFC packet may be set to a value "1" representing that a corresponding packet is not a physical packet.

Bits 14-13 of the InitFC packet may be set to a value "00" representing a flow control packet, and bits 12-09 may be a field for distinguishing an InitFC1 packet or an InitFC2 packet. For example, when a corresponding field is set to 0100, the bits 12-09 may represent the InitFC1 packet, and when a corresponding field is set to 1100, the bits 12-09 may represent the InitFC2 packet.

Bits 8 and 31-28 of the InitFC packet may be set to CHA_ID, and bits 27-24 of the InitFC packet may be set to LAN_ID.

Bits 23-16 of the InitFC packet may represent a size of a buffer.

Bits 39-32 of the InitFC packet may be set to 0x9C which is the control symbol.

When there is information (byte enable information of a header) dependent on a header buffer/data buffer, bits 47-40 of the InitFC packet may represent a size of a buffer for storing the dependent information.

Bits 55-48 and 63-56 of the InitFC packet may store 16-bit cyclical redundancy check (CRC) of a control packet. Therefore, a receiver may verify a validity of a packet by using CRC.

Flow Control Initialization Packet Using InitFC Packet

Next, a flow control initialization operation which is performed by the host transmission and reception apparatus 2200 and the device transmission and reception apparatus 2300 by using the InitFC packet will be described. In this case, the flow control initialization operation and the data packet transmission and reception operation may be performed by a logical lane. Here, the logical lane may include a logical transmitter and a logical receiver.

Each logical lane of the host transmission and reception apparatus 2200 may transmit, through a preset physical channel, the flow control initialization packet to a corresponding logical lane among logical lanes of the device transmission and reception apparatus 2300.

>>When Physical Transmitters/Receivers 0-4 Normally Operate Based on Connection Structure of FIG. 2A and FIG. 2B.

A host logical lane 0 may know that a host physical transmitter 0 is connected to a device physical receiver 0, and thus may transmit an InitFC1 packet (LAN_ID=0) to the host physical transmitter 0. Also, a host logical lane 1 may know that a host physical transmitter 1 is connected to a device physical receiver 1, and thus may transmit an InitFC1 packet (LAN_ID=1) to the host physical transmitter 1. Also, a host logical lane 2 may know that a host physical transmitter 2 is connected to a device physical receiver 2, and thus may transmit an InitFC1 packet (LAN_ID=2) to the host physical transmitter 2. Also, a host logical lane 3 may know that a host physical transmitter 3 is connected to a device physical receiver 3, and thus may transmit an InitFC1 packet (LAN_ID=3) to the host physical transmitter 3. Also, a host logical lane 4 may know that a host physical transmitter 4 is connected to a device physical receiver 4, and thus may transmit an InitFC1 packet (LAN_ID=4) to the host physical transmitter 4.

A device logical lane 0 may know that a device physical transmitter 0 is connected to a host physical receiver 0, and thus may transmit an InitFC1 packet (LAN_ID=0) to the device physical transmitter 0. Also, a device logical lane 1 may know that a device physical transmitter 1 is connected to a host physical receiver 1, and thus may transmit an InitFC1 packet (LAN_ID=1) to the device physical transmitter 1. Also, a device logical lane 2 may know that a device physical transmitter 2 is connected to a host physical receiver 2, and thus may transmit an InitFC1 packet (LAN_ID=2) to the device physical transmitter 2. Also, a device logical lane 3 may know that a device physical transmitter 3 is connected to a host physical receiver 3, and thus may transmit an InitFC1 packet (LAN_ID=3) to the device physical transmitter 3. Also, a device logical lane 4 may know that a device physical transmitter 4 is connected to a host physical receiver 4, and thus may transmit an InitFC1 packet (LAN_ID=4) to the device physical transmitter 4.

>>When Physical Transmitters/Receivers 0-4 Normally Operate Based on The Above-Described ③ Connection Structure In a flow control initialization operation based on ③ connection structure, a host logical lane 0 may transmit an InitFC1 packet (LAN_ID=0) to a host physical transmitter 4, a host logical lane 1 may transmit an InitFC1 packet (LAN_ID=1) to a host physical transmitter 0, a host logical lane 2 may transmit an InitFC1 packet (LAN_ID=2) to a host physical transmitter 3, a host logical lane 3 may transmit an InitFC1 packet (LAN_ID=3) to a host physical transmitter 1, and a host logical lane 4 may transmit an InitFC1 packet (LAN_ID=4) to a host physical transmitter 2.

In the flow control initialization operation based on ③ connection structure, a device logical lane 0 may transmit an InitFC1 packet (LAN_ID=0) to a device physical transmitter 1, a device logical lane 1 may transmit an InitFC1 packet (LAN_ID=1) to a device physical transmitter 3, a device logical lane 2 may transmit an InitFC1 packet (LAN_ID=2) to a device physical transmitter 4, a device logical lane 3 may transmit an InitFC1 packet (LAN_ID=3) to a device physical transmitter 2, and a device logical lane 4 may transmit an InitFC1 packet (LAN_ID=4) to a device physical transmitter 0.

>>When Device Physical Transmitter 0 Cannot Normally Operate Based on Connection Structure of FIG. 2A and FIG. 2B.

Hereinafter, a flow control initialization operation when a device physical transmitter 0 cannot operate due to a fault will be described. For example, in an embodiment of the present invention, when the device physical transmitter 0 cannot operate, a device physical receiver 0 paired with the device physical transmitter 0 is not used.

In this case, all host logical transmitters may know that a device physical lane 0 is not connected to a host physical lane 0, a device physical lane 1 is connected to a host physical lane 1, a device physical lane 2 is connected to a host physical lane 2, a device physical lane 3 is connected to a host physical lane 3, and a device physical lane 4 is connected to a host physical lane 4, through the physical channel initialization operation. Here, the physical lanes 0 to 4 may respectively include physical transmitters 0 to 4 and physical receivers 0 to 4.

Therefore, since there is no physical channel connected to the host logical transmitter 0, the host logical transmitter 0 may transmit an InitFC1 packet (LAN_ID=0) to the host physical transmitter 1 instead of the host physical transmitter 0 which is a default, the host logical transmitter 1 may transmit an InitFC1 packet (LAN_ID=1) to the host physical transmitter 1, the host logical transmitter 2 may transmit an InitFC1 packet (LAN_ID=2) to the host physical transmitter 2, the host logical transmitter 3 may transmit an InitFC1 packet (LAN_ID=3) to the host physical transmitter 3, and the host logical transmitter 4 may transmit an InitFC1 packet (LAN_ID=4) to the host physical transmitter 4.

Moreover, all device logical transmitters may know that a host physical lane 0 is not connected to any device physical lane, a host physical lane 1 is connected to a device physical lane 1, a host physical lane 2 is connected to a device physical lane 2, a host physical lane 3 is connected to a device physical lane 3, and a host physical lane 4 is connected to a device physical lane 4.

Therefore, the device logical transmitter 0 may transmit an InitFC1 packet (LAN_ID=0) to the device physical transmitter 1 instead of the device physical transmitter 0, and the other device logical transmitters may normally operate. In detail, the device logical transmitter 1 may transmit an InitFC1 packet (LAN_ID=1) to the device physical transmitter 1, the device logical transmitter 2 may transmit an InitFC1 packet (LAN_ID=2) to the device physical transmitter 2, the device logical transmitter 3 may transmit an InitFC1 packet (LAN_ID=3) to the device physical transmitter 3, and the device logical transmitter 4 may transmit an InitFC1 packet (LAN_ID=4) to the device physical transmitter 4.

>>When Device Physical Transmitter 0 Cannot Normally Operate Based on ☹ Connection Structure FIG. 4B is a flowchart illustrating a flow control initialization method based on ☹ connection structure according to an embodiment of the present invention.

In step S410, all the host logical transmitters may check that that the device physical lane 0 is not connected to any host physical lane, the device physical lane 1 is connected to the host physical lane 0, the device physical lane 2 is connected to the host physical lane 3, the device physical lane 3 is connected to the host physical lane 1, and the device physical lane 4 is connected to the host physical lane 2, through the physical channel initialization operation.

Subsequently, in step S420, the host logical transmitters 0 to 4 may transmit a flow control initialization packet "InitFC1" by using physical channels other than an inoperable physical channel.

In detail, since there is no physical channel connected to the host logical transmitter 0, the host logical transmitter 0 may transmit the InitFC1 packet (LAN_ID=0) to the host physical transmitter 1 instead of the host physical transmitter 0 which is a default value, and the other host logical transmitters may normally operate. The host logical transmitter 1 may transmit the InitFC1 packet (LAN_ID=1) to the host physical transmitter 0, the host logical transmitter 2 may transmit the InitFC1 packet (LAN_ID=2) to the host physical transmitter 3, the host logical transmitter 3 may transmit the InitFC1 packet (LAN_ID=3) to the host physical transmitter 1, and the host logical transmitter 4 may transmit the InitFC1 packet (LAN_ID=4) to the host physical transmitter 2. In this case, the InitFC1 packet (LAN_ID=1) transmitted from the host logical transmitter 0 may be transferred to the device logical transmitter 0 through the host physical transmitter 0, the device physical receiver 1, and the device physical transmitter 1.

In more detail, the host logical transmitter 0 may intend to transmit the InitFC1 packet to the device physical lane 0, for transmitting a packet to the device logical transmitter 0. However, since there is no host physical transmitter connected to the device physical lane 0, the host logical transmitter 0 may transmit the InitFC1 packet to a host physical transmitter which is set as a default. Also, the host logical transmitter 1 may transmit the InitFC1 packet to a host physical transmitter of the host physical lane 0 paired with the device logical transmitter 1, for transmitting a packet to the device logical transmitter 1. Likewise, the host logical transmitters 2 to 4 may respectively transmit the InitFC1 packet to the device physical transmitters 2 to 4 respectively paired with the device logical transmitters 2 to 4.

A case where the device transmission and reception apparatus 2300 performs the above-described InitFC1 packet transmission operation will be described below.

In step 410, all the device logical transmitters may check that that the host physical lane 0 is connected to the device physical lane 1, the host physical lane 1 is connected to the device physical lane 3, the host physical lane 2 is connected to the device physical lane 4, the host physical lane 3 is connected to the device physical lane 2, and there is no device physical lane connected to the host physical lane 4.

Therefore, in step S420, the device logical transmitters 0 to 4 may transmit the flow control initialization packet "InitFC1" by using physical channels other than an inoperable physical channel.

In detail, the device logical transmitter 0 may transmit the InitFC1 packet (LAN_ID=0) to the device physical transmitter 1, for transmitting the InitFC1 packet (LAN_ID=0) to the host logical receiver 0. Also, the device logical transmitter 1 may transmit the InitFC1 packet (LAN_ID=1) to the device physical transmitter 3, for transmitting the InitFC1 packet (LAN_ID=1) to the host logical receiver 1. Also, the device logical transmitter 2 may transmit the InitFC1 packet (LAN_ID=2) to the device physical transmitter 2, for transmitting the InitFC1 packet (LAN_ID=2) to the host logical receiver 2. Also, the device logical transmitter 3 may transmit the InitFC1 packet (LAN_ID=3) to the device physical transmitter 2, for transmitting the InitFC1 packet (LAN_ID=3) to the host logical receiver 3. Also, the device logical transmitter 4 may intend to transmit the InitFC1 packet (LAN_ID=4) to the host logical transmitter 4, but since there is no host physical lane connected to the host logical transmitter 4, the device logical transmitter 4 may transmit the InitFC1 packet (LAN_ID=4) to the device physical lane which is a default value. Then, the InitFC1 packet (LAN_ID=4) transmitted from the device logical transmitter 4 may be transferred to the host logical transmitter 4 through the host physical lane 2 connected to the device physical lane 4.

As described above, according to an embodiment of the present invention, an incommunicable physical lane is checked through the physical lane initialization operation, and a packet is transmitted and received through physical channels other than the incommunicable physical lane. Accordingly, if there is at least one physical lane link where a setting of a physical lane is completed, an initialization packet is transmitted.

Through the above-described operation, a receiver (i.e., a logical receiver of the host transmission and reception apparatus 2200 or the device transmission and reception apparatus 2300) which has received an InitFC1 packet may inform its own logical transmitter that the InitFC1 packet is received in step S430.

In step S440, each host logical transmitter and each device logical transmitter may transmit an InitFC2 packet to inform a logical receiver of the other side that buffer information of the other side is checked.

Therefore, device or host logical receivers 0 to 4 may receive the InitFC2 packet, and when all the device or host logical receivers 0 to 4 receive the InitFC2 packet, the flow control initialization operation may be terminated. Here, whether all the device or host logical receivers 0 to 4 receive the InitFC2 packet may be checked by the device 2400 or the host 2100.

Figure 4C:
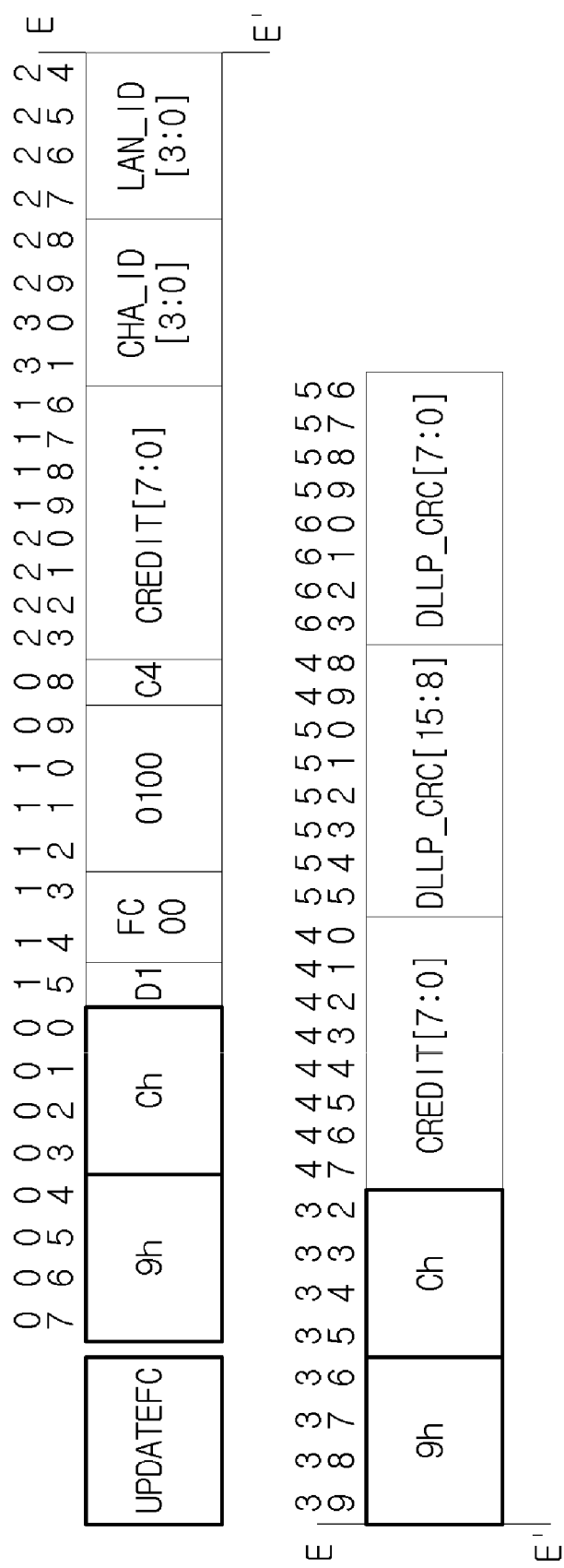
FIG. 4C illustrates a structure of a flow control update packet according to an embodiment of the present invention.

Moreover, even after the flow control initialization operation is completed, a host logical transmitter and a device logical transmitter may periodically transmit a flow control update packet illustrated in FIG. 4C, thereby informing the other side of a change in the amount of its own buffer. FIG. 4C illustrates a structure of a flow control update packet according to an embodiment of the present invention.

As illustrated in FIG. 4C, the flow control update packet is almost similar to the flow control initialization packet, but has a difference with the flow control initialization packet in that bits 12-09 are set to 1000.

Through such a process, when the amount of a buffer directly affects the other side, for example, when the amount of the buffer is changed from a state, where is incapable of receiving a packet of the other side, to a state where the buffer becomes empty and thus is capable of receiving the packet of the other side, the packet of the other side is immediately received, and thus, packet communication is smoothly performed.

③ Data Packet Transmission and Reception Operation

When the flow control initialization operation is completed, a host logical transmitter/receiver and a device logical transmitter/receiver may transmit and receive a data packet. A 64-bit-unit writing data packet may be constructed in a structure illustrated in FIG. 5A to FIG. 5E. FIG. FIG. 5A to FIG. 5E illustrate a structure of a writing data packet according to an embodiment of the present invention.

Writing Data Packet

In FIG. 5A to FIG. 5E, an uppermost packet is a writing header packet (MWrH in FIG. 5A), and bits 7-0 may be set to a symbol "0xFB" which indicates a start of a transaction packet. A symbol "0xFD" which indicates an end of a packet may be added to a last 8-bit symbol of a header packet.

A bit 15 of the writing header packet is a field indicating the writing header packet and may be set to a value "0".

A bit 14 of the writing header packet is a field indicating that a data payload packet is accompanied, and may have, for example, a value "1".

Bits 13-08 of the writing header packet are a field indicating a length of data and are 6 bits. Therefore, in a packet structure according to an embodiment of the present invention, data may be transmitted in units of 64 bits and thus may have a length of up to total 4 KB.

Bits 23-16 (HSEQ) of the writing header packet indicate a sequence number value and enable total 256 packets to be identified. Here, a receiving side may identify a sequence of a combination packet by using an HSEQ field. To provide a detailed description, one header may be constructed by a combination of a plurality of data payloads, and thus, the combination packet may be constructed by a combination of a data payload and a header which have the same PSEQ. However, a writing operation may accompany transmission of a plurality of combination packets, and thus, the plurality of combination packets may be distinguished by the HSEQ field.

Bits 29-24 (PSEQ) of the writing header packet indicate a sequence of a data payload. Each logical receiver may identify a payload which is accompanied by a corresponding header according to a sequence.

Unlike the writing packet, the writing header packet may include an address [63:6] field, and thus, 64-bit addressing may be performed. This is because in a packet structure according to an embodiment of the present invention, data is transmitted and received in units of 64 bytes, and thus, lower 6 bits are not needed.

Moreover, byte enables BE[0:7] to BE[63:56] which are additional information of the writing header packet may be constructed by total 64 bytes, and may inform whether to apply writing for each of the 64 bytes.

For example, when a data length exceeds 64 bytes and thus a plurality of 64-byte-unit data transmissions occur (i.e., bits 13-8 are set to a value instead of 1), a value of byte enable may increase in units of 64 bits in correspondence with a data length.

32-bit CRC may be added to a latter portion of the writing header packet, and thus, a receiver may check a validity of a packet by using the 32-bit CRC.

Figure 5A:
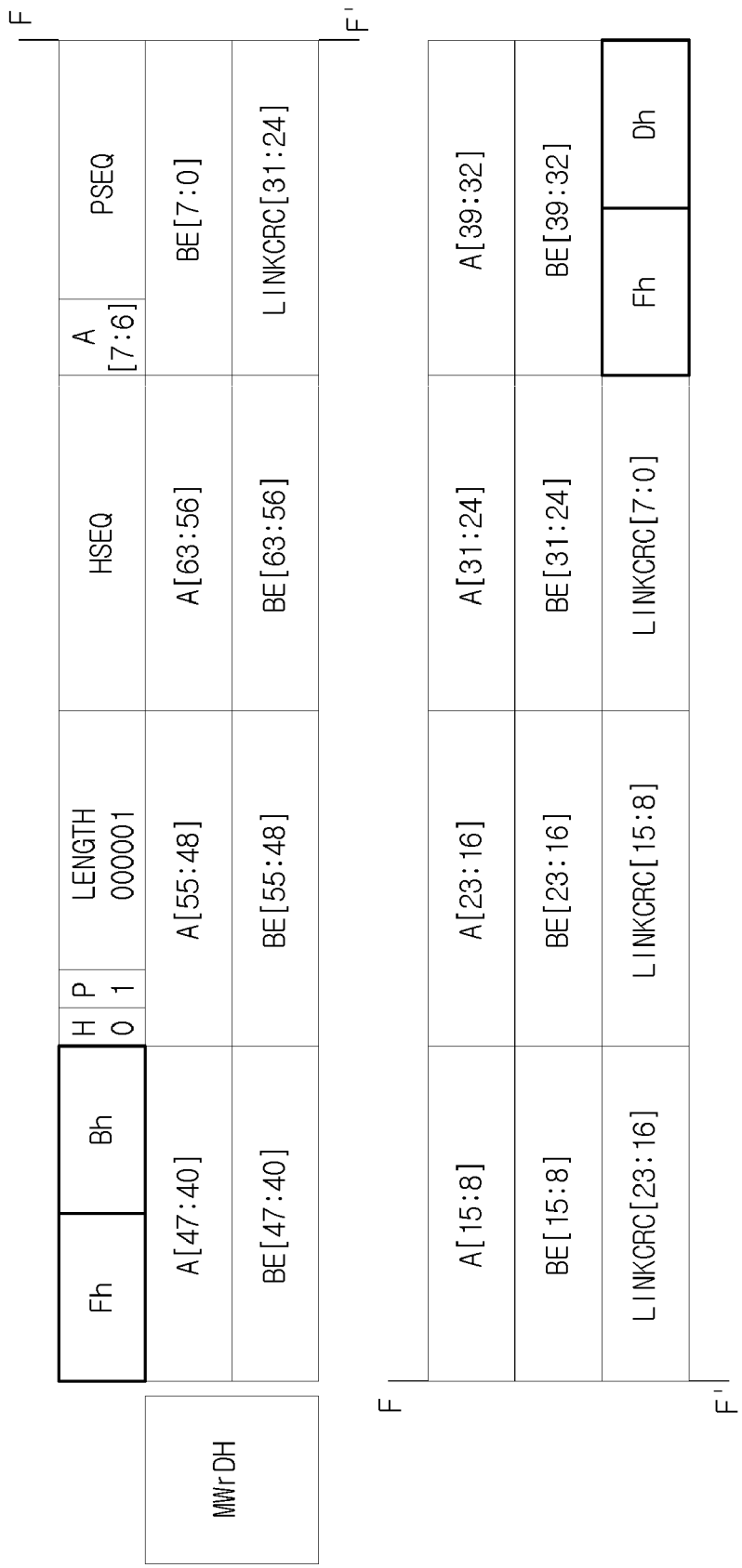
FIG. 5A to FIG. 5E illustrate a structure of a writing data packet according to an embodiment of the present invention.
Figure 5B:
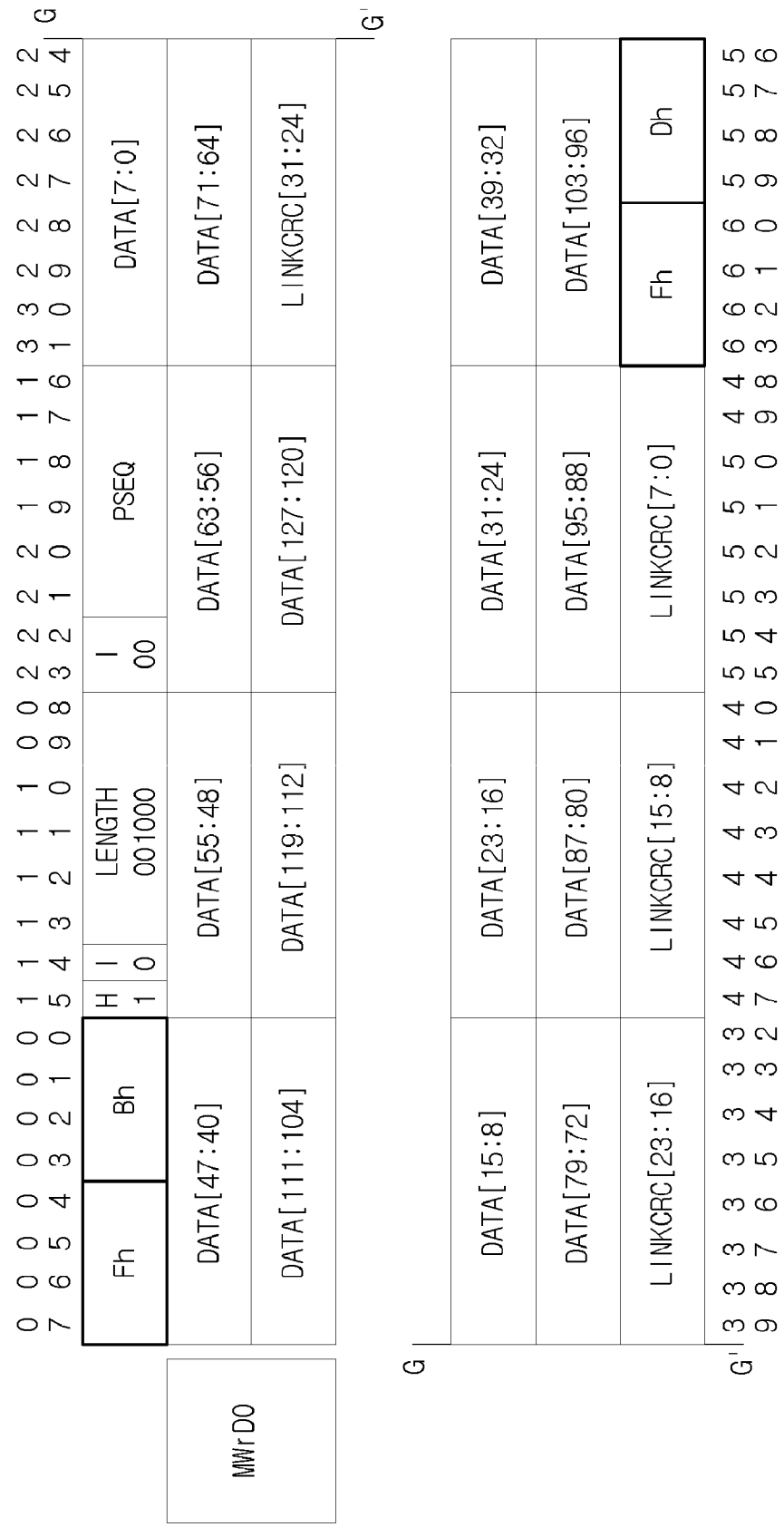
Figure 5C:
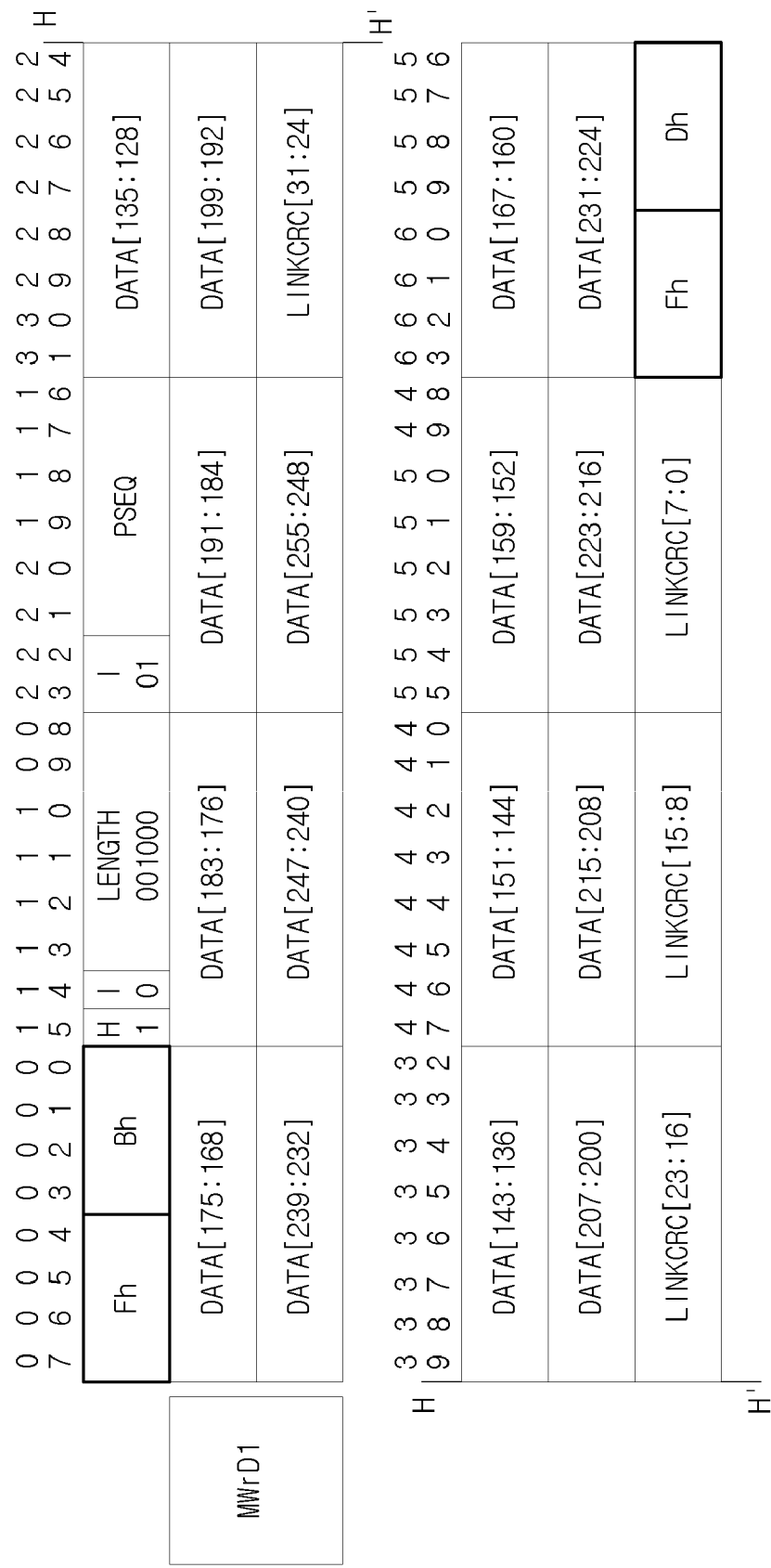
Figure 5D:
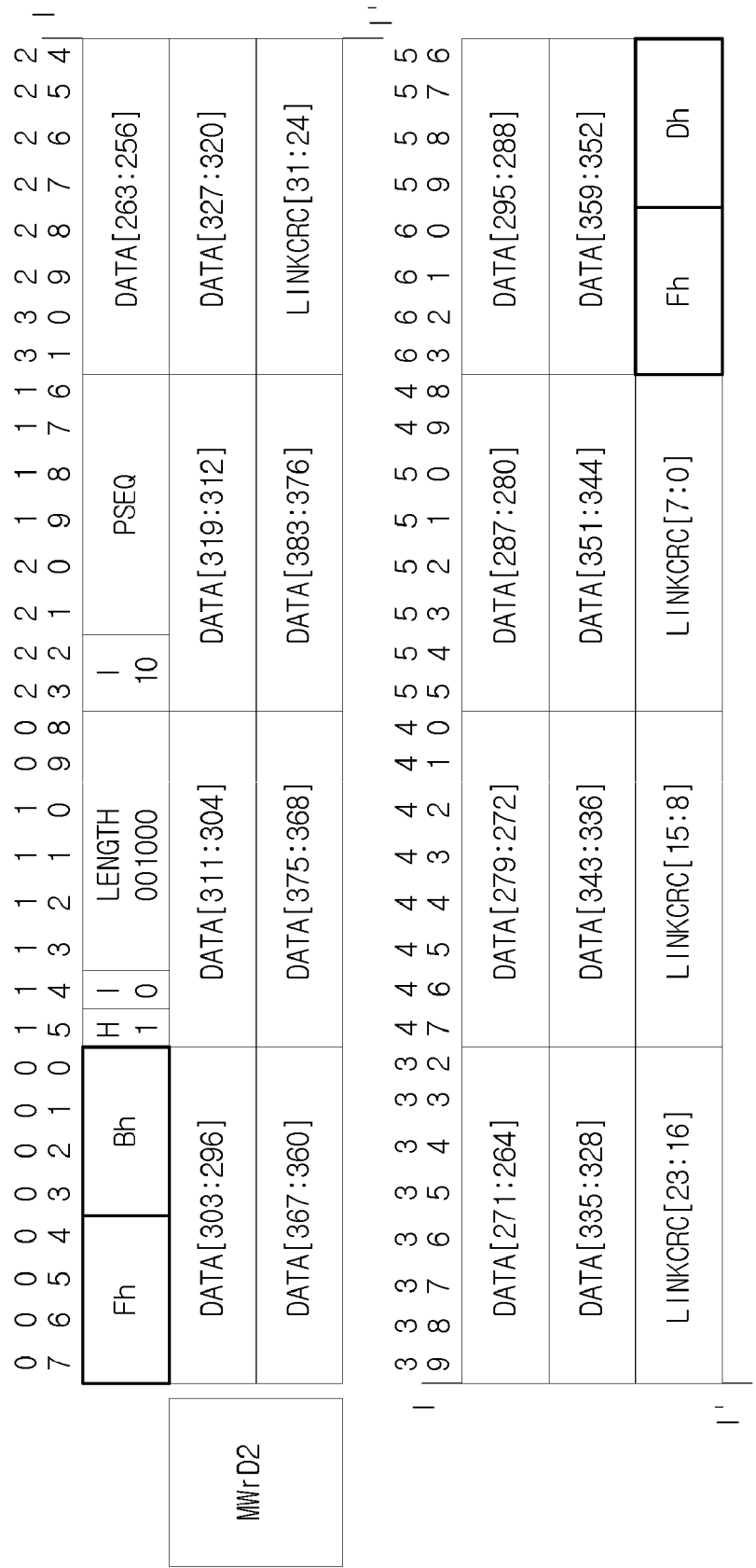
Figure 5E:
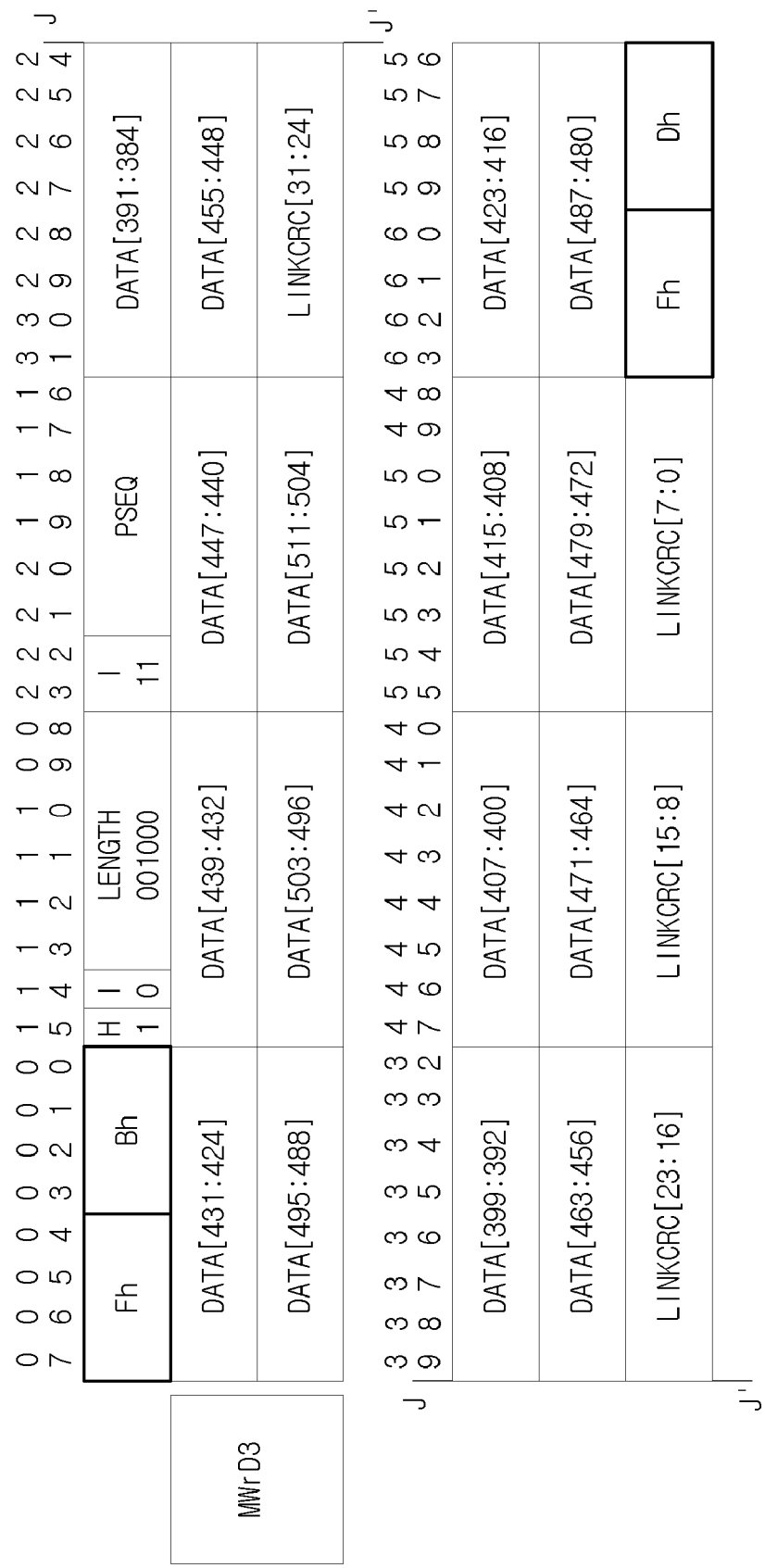

As in MWrD0 to MWrD3 of FIG. 5A, in a data payload packet, bits 7-0 may be constructed by 0xFB which is a symbol indicating a start of a packet similarly to the writing header packet, and a bit 15 subsequent thereto may be set to 1 and may indicate a corresponding packet being a data payload.

Bits 13-08 of the data payload packet may represent a byte-unit length of a data payload, and in the packet structure according to an embodiment of the present invention, total 64 bytes may be transmitted through four lanes. Therefore, 16 bytes may be transmitted through each lane. In order to indicate this, the bits 13-08 of the data payload packet may be set to 001000b.

A bit 14 and bits 23-22 of the data payload packet may represent a lane number, and a data lane may be identified up to eight lanes. In FIG. 2, four lanes may be used and thus may be divided into 000, 001, 010, and 011.

Bits 21-16 (PSEQ) of the data payload packet may be a data payload sequence for associating with the writing header packet. In a system having a general cache structure, the number of packets is about one-four of read packets. Therefore, in the present embodiment, the number of bits of a sequence necessary for the writing packet may be set to one-four of bits of a sequence for identifying the writing header packet, and thus, a case where the number of bits of the sequence necessary for the writing packet is set to a value which is two less than the number of bits of the sequence for identifying the writing header packet has been described above as an example. As described above, a PSEG field may be used to determine a co-dependent relationship of a header packet and a data packet.

Moreover, the PSEG field may be used to transmit data packets in order. This will be described below along with a response control packet.

A data payload of 16 bytes (bits 127-0) may succeed a payload sequence field, 32-bit CRC may be subsequently provided, and 0xFD which is a symbol indicating an end of a packet may be subsequently provided.

As described above, each data packet according to an embodiment of the present invention may be transmitted through a plurality of logical lanes and may include identifiable field (a payload sequence). Therefore, in a host logical receiver and a device logical receiver, when all data packets are received with respect to the writing header packet, access necessary for a receiver may be performed without compensating for a skew between lanes.

Moreover, a host logical lane and a device logical lane according to an embodiment of the present invention may arbitrarily select a physical lane before transmitting each data packet and may transmit a packet, and thus, even when an error occurs in a portion of a physical lane, it is possible to transmit a packet.

As described above, a writing packet may include a field for carrying a lane number, and a physical lane which has received the writing packet may check a logical lane, which has transferred the writing packet, with reference to the lane number included in the writing packet.

In detail, in the writing header packet, when H of a bit 15 is 0, a receiving end may be set to a logical lane 0. Also, in the writing data payload packet, when H of the bit 15 is 1 and I which is a bit 14 and bits 23-22 is 000, a receiving end may be set to a logical lane 1. Also, when H of the bit 15 is 1 and I which is the bit 14 and the bits 23-22 is 001, a receiving end may be set to a logical lane 2. Also, when H of the bit 15 is 1 and I which is the bit 14 and the bits 23-22 is 010, a receiving end may be set to a logical lane 3. Also, when H of the bit 15 is 1 and I which is the bit 14 and the bits 23-22 is 011, a receiving end may be set to a logical lane 4.

Therefore, a logical lane of a transmitting side may set a lane number of a writing packet according to a number of a physical lane of each of the transmitting side and a receiving side corresponding to a logical lane of the receiving side. Here, the physical lane of the receiving side and the logical lane of the receiving side may have a structure which corresponds to each other in a one-to-one correspondence relationship. In detail, in a normal case, a physical lane 0 of the receiving side may correspond to a logical lane 0 of the receiving side, a physical lane 1 of the receiving side may correspond to a logical lane 1 of the receiving side, a physical lane 2 of the receiving side may correspond to a logical lane 2 of the receiving side, a physical lane 3 of the receiving side may correspond to a logical lane 3 of the receiving side, and a physical lane 4 of the receiving side may correspond to a logical lane 3 of the receiving side. Therefore, the logical lane of the transmitting side may set a lane number of the physical lane of the receiving side, and may transfer a packet, which is to be transmitted, to a physical lane of the transmitting side which matches the physical lane of the receiving side, thereby transferring the packet to a desired logical lane.

Therefore, a physical lane which has received each packet may send the writing packet to a logical lane corresponding thereto by using a lane number included in the writing packet. In detail, in a host and a device, when the physical lane of the receiving side checks the writing header packet, the physical lane of the receiving side may fixedly transmit the writing header packet to the logical lane 0, and when the physical lane of the receiving side checks the data payload packet, the physical lane of the receiving side may transmit the data payload packet to a suitable logical lane among the logical lanes 1 to 4. For example, when the lane number included in the writing packet is 1000, the physical lane of the receiving side may transmit a corresponding writing packet to the logical lane 1.

In FIG. 2A and FIG. 2B, it is illustrated that each physical receiver is connected to all logical receivers. This is for enabling a packet to be normally received by using a separate physical lane receiver even in a case where when a physical transmitter is defective, a physical receiver paired with the defective physical transmitter is not used.

Due to such a structure, if at least one physical transmitter normally operates, a packet is normally transmitted and received between two transmission and reception apparatuses.

Response Control Packet

A logical receiver which has received a packet may check CRC of the received packet to determine whether the packet is normally received. Here, whether the packet is normally received may be determined by another element of each of the host transmission and reception apparatus 2200 and the device transmission and reception apparatus 2300.

Figure 5F:
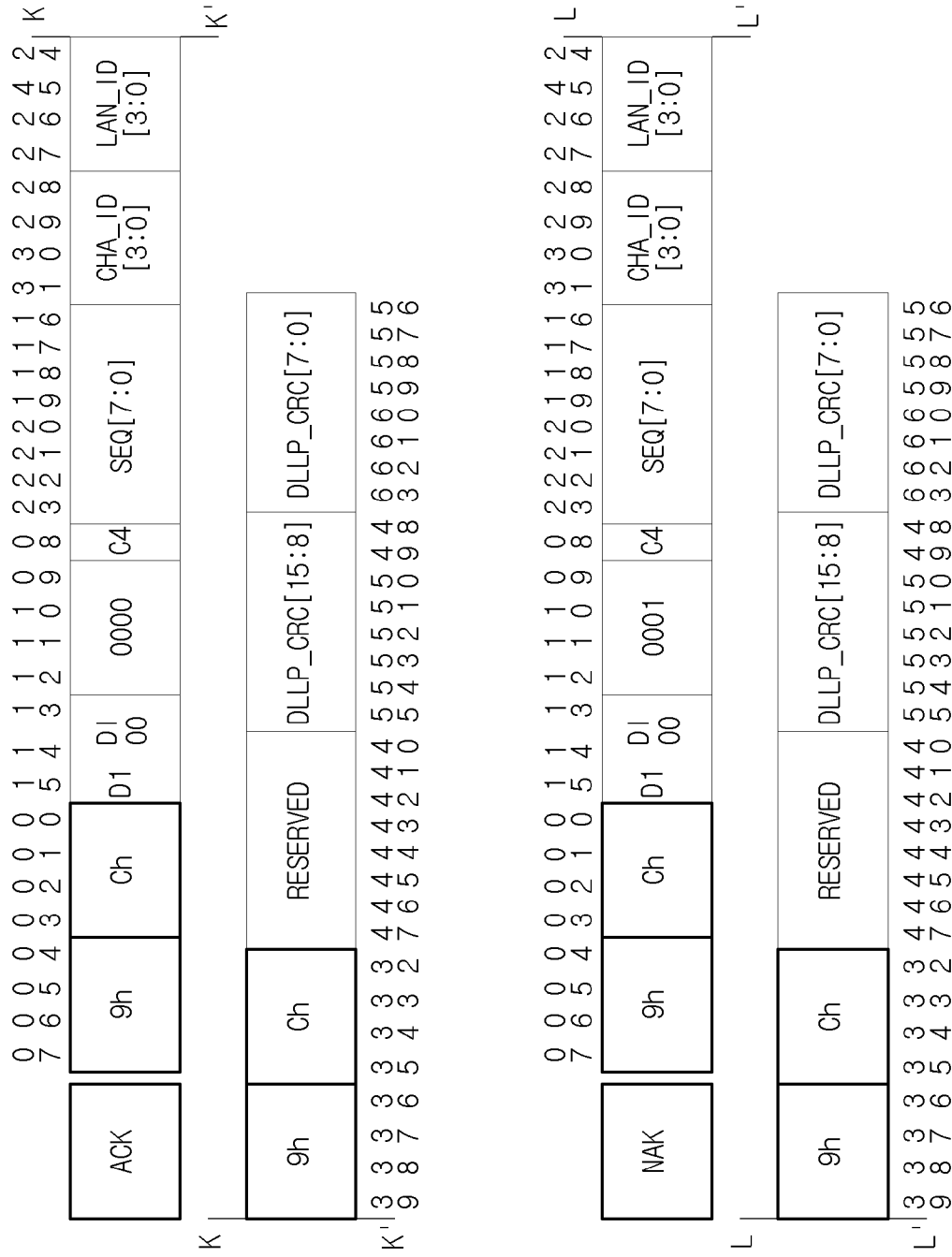
FIG. 5F illustrates a structure of a response control packet according to an embodiment of the present invention.

Moreover, the logical receiver which has received the packet or the other element of each of the host transmission and reception apparatus 2200 and the device transmission and reception apparatus 2300 may transmit a response control packet, which informs whether the packet is normally received through its own logical transmitter, to a logical receiver of the other side. In this case, the response control packet may have a format illustrated in FIG. 5F. FIG. 5F illustrates a structure of a response control packet according to an embodiment of the present invention.

Referring to FIG. 5F, bits 7-0 of the response control packet may start with a symbol "0x9C" indicating a control packet.

A bit 15 of the response control packet is a value indicating that a corresponding packet is not a physical packet, and may be set to 1.

Bits 14-13 of the response control packet are a field indicating a packet which informs whether data is received, and may be set to 01. The response control packet may be distinguished from the flow control packet.

When a packet is normally received as a check result of a received packet, bits 12-09 of the response control packet may be set to 0000, and when a packet where a sequence or CRC is defective is received, the bits 12-09 of the response control packet may be set to 0001. Therefore, the response control packet indicating ACK and NAK may be distinguished.

Bits 23-16 of the response control packet may be used to indicate a sequence which has been normally received to date. In a logical lane which is used for transmission and reception of a header packet, 8 bits of a corresponding field may be all used. In a logical lane which is used for transmission and reception of a data packet, only lower 6 bits of the corresponding field may be used.

For example, PSEQ of a received data packet may have the order of 0, 1, 2 and 3, and then, a data packet where PSEQ is 4 may not be received, whereupon a data packet where PSEQ is 5 may be suddenly received. In this case, since a logical transmitter of a receiving side does not receive a data packet where PSEG is set to 4, the logical transmitter may add a value "3" to bits 23-16 of the response control packet to send NAK. Therefore, a transmitting side may know that up to a data packet where PSEG is set to 3 has been normally received, but the data packet where PSEQ is set to 4 is not received. Accordingly, the transmitting side may retransmit packets in sequence from the data packet where PSEQ is set to 4.

Bits 08 and 31-28 of the response control packet may indicate a channel ID, and bits 27-24 may indicate a lane number. Therefore, the transmitting side may transmit the response control packet according to a lane number of a logical lane of the other side checked from a physical channel.

The response control packet may be received through the following process.

When each logical transmitter checks that a packet is normally received, each logical transmitter may transmit a response control packet representing ACK to a logical receiver of the other side. On the other hand, when each logical transmitter checks that a packet is not normally received, each logical transmitter may transmit a response control packet representing NAK (which indicates that the packet is not normally received) to a logical transmitter of the other side.

In this case, a logical transmitter which has checked reception of ACK may access and transmit a next packet. On the other hand, a logical transmitter which has received NAK or has received ACK for a certain time may retransmit a packet and thus enables normal packet to be transferred to a logical receiver of the other side.

Read Packet Transmission and Reception Operation

Figure 6A:
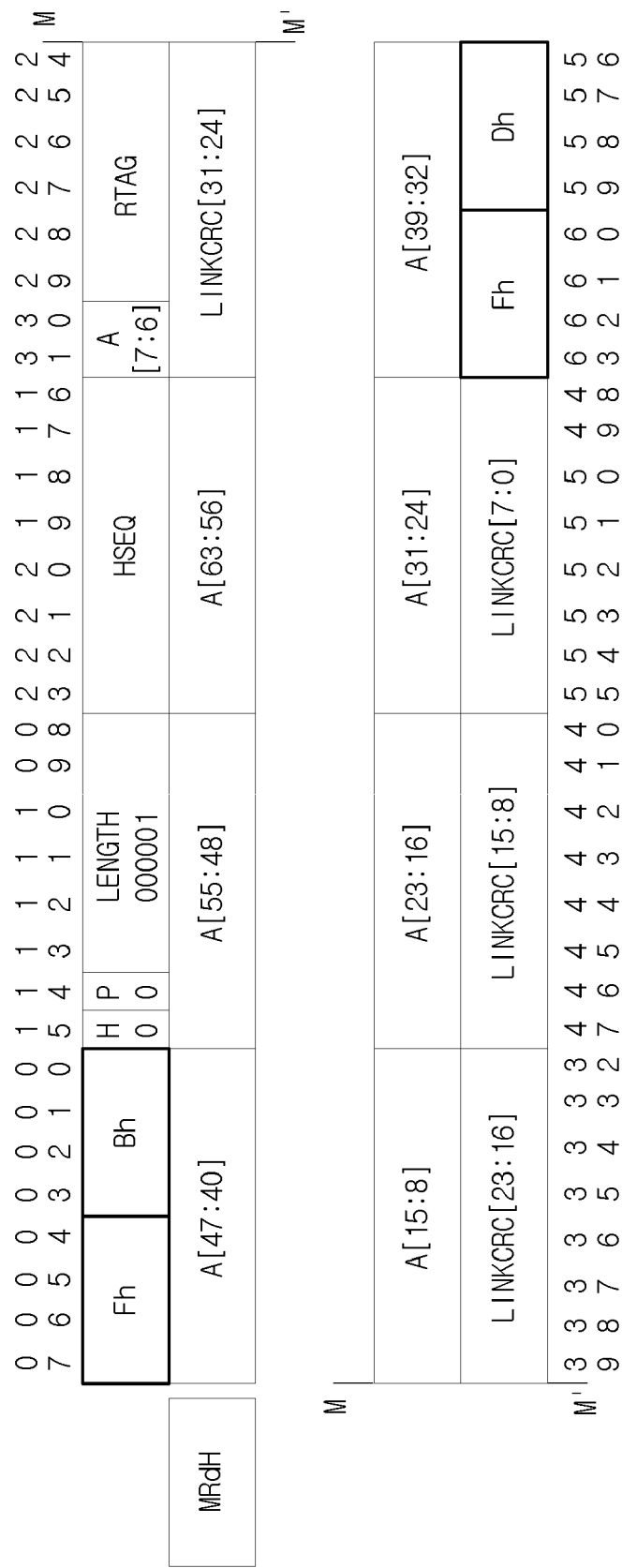
FIG. 6A illustrates a structure of a read packet according to an embodiment of the present invention.
Figure 6B:
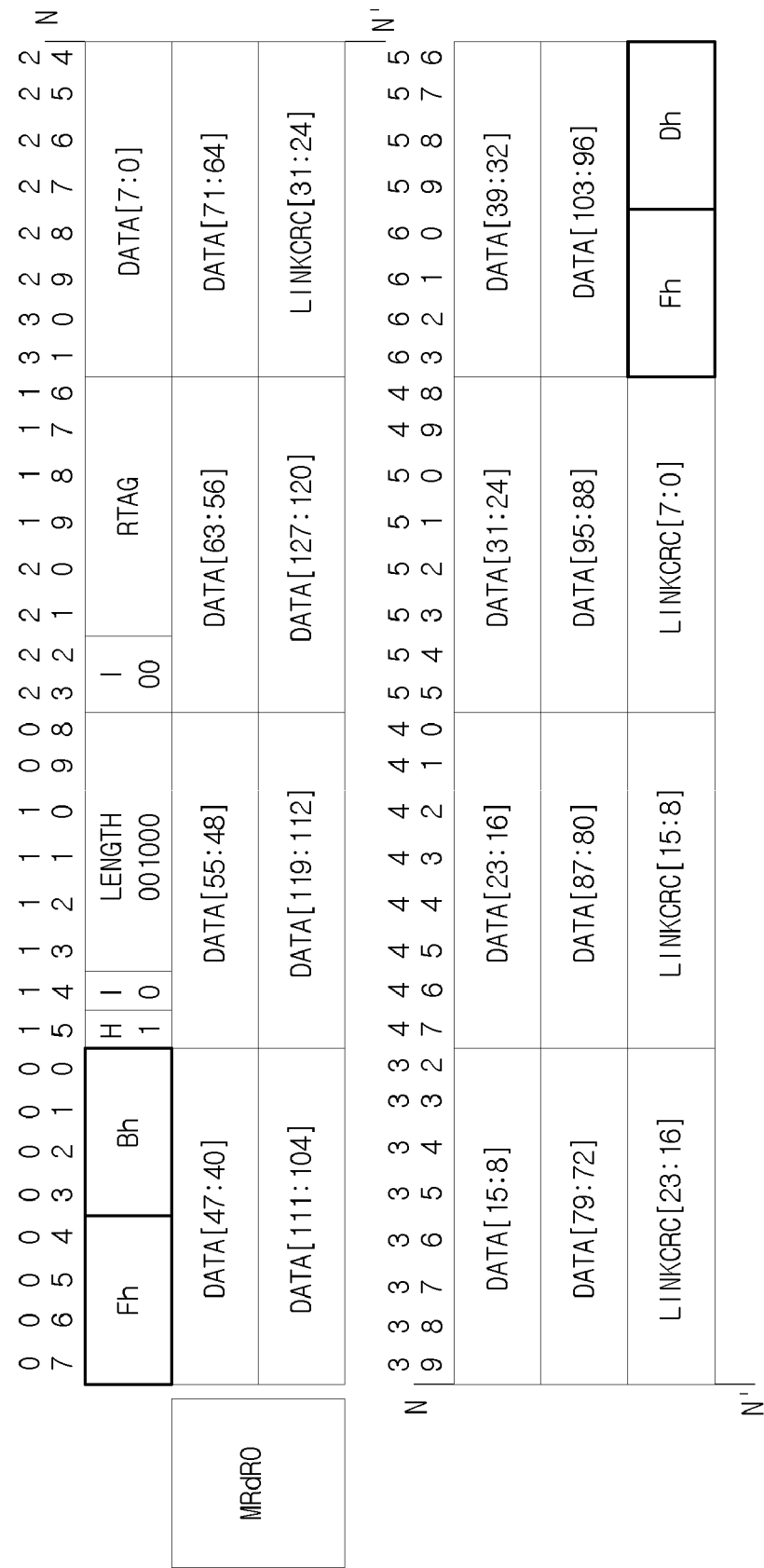
FIG. 6B to FIG. 6E illustrate a structure of a read response packet according to an embodiment of the present invention.
Figure 6C:
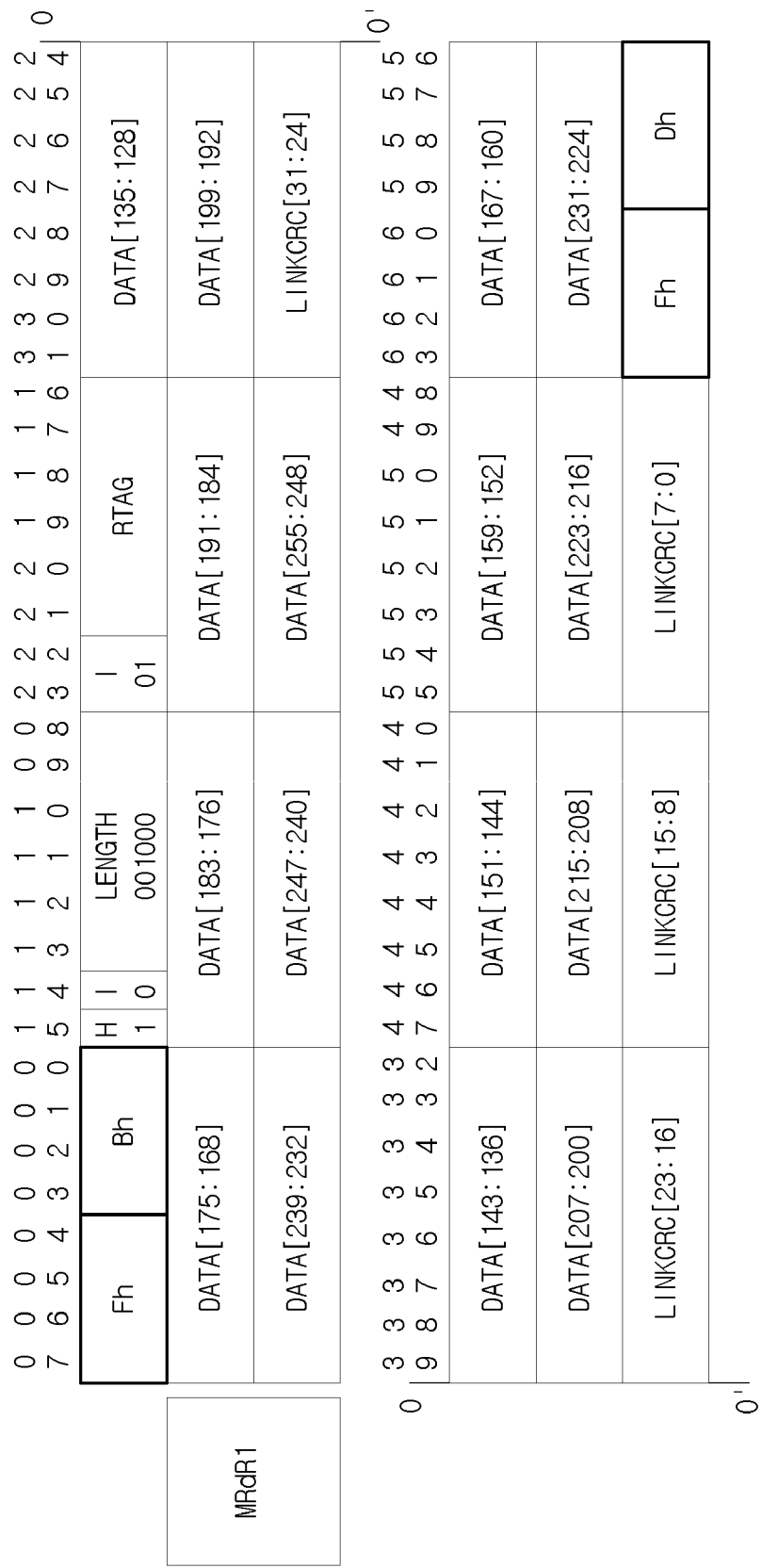
Figure 6D:
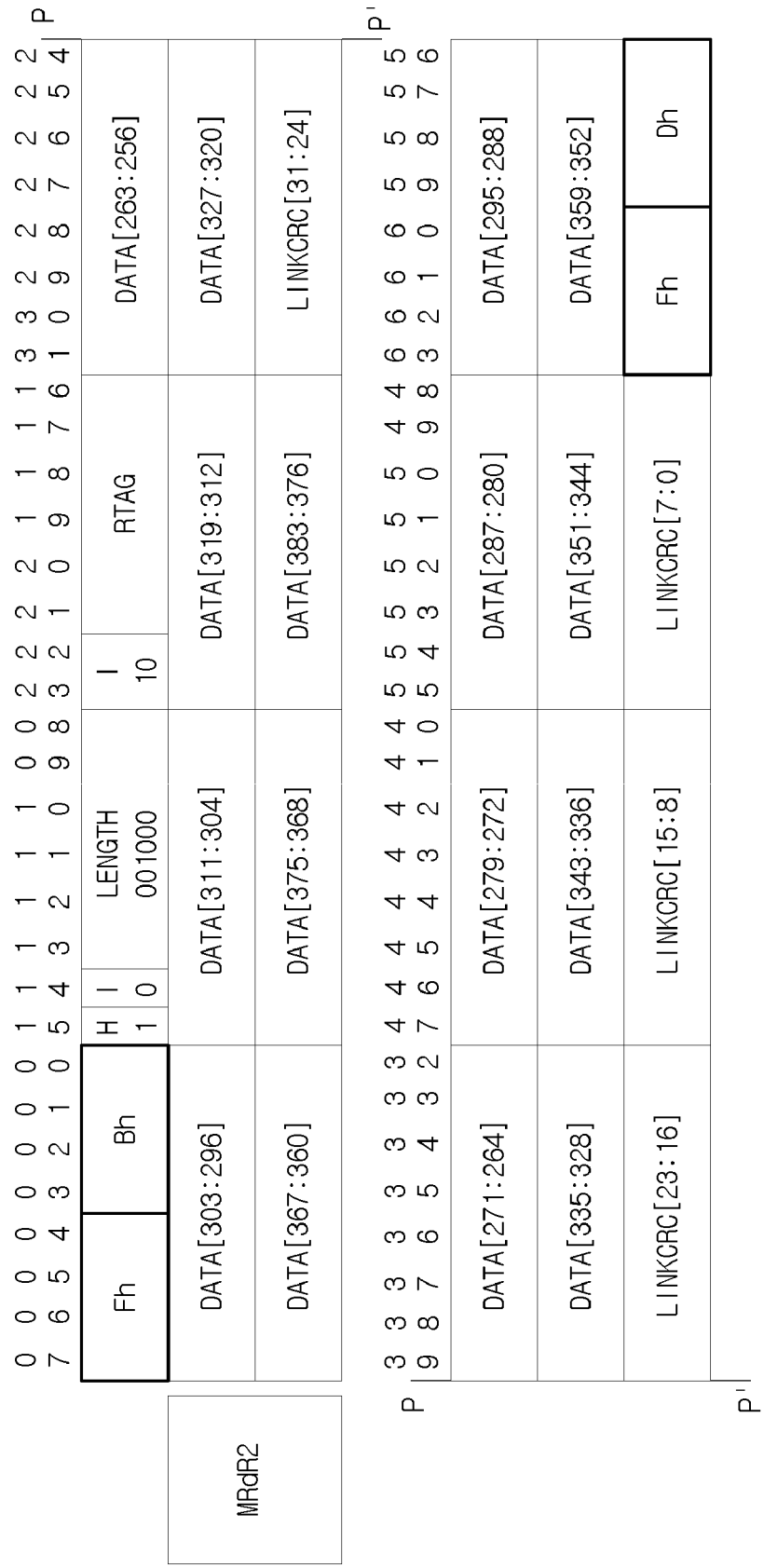
Figure 6E:
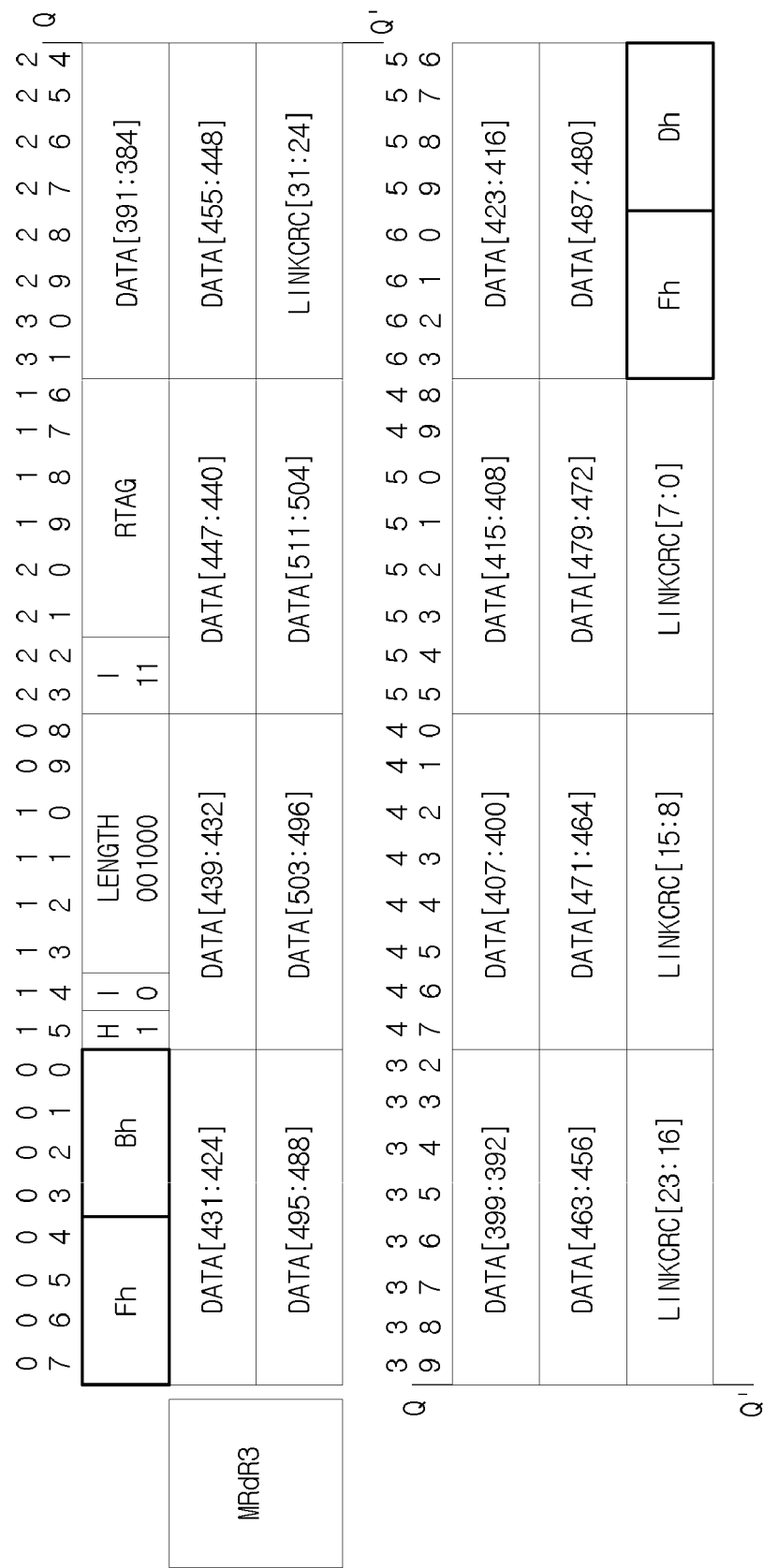

Hereinafter, a read packet transmission and reception operation performed by the host transmission and reception apparatus 2200 and the device transmission and reception apparatus 2300 will be described with reference to FIGS. 6A and 6B to 6E. FIG. 6A illustrates a structure of a read packet according to an embodiment of the present invention. FIG. 6B to FIG. 6E illustrate a structure of a read response packet according to an embodiment of the present invention.

As illustrated in FIG. 6A, a read packet according to an embodiment of the present invention may be composed of only a header, and data desired to read may be designated by using the read header. Hereinafter, each field of the read packet will be described in detail.

Bits 7-0 of the read packet may start with 0xFB which is a symbol indicating a start of a packet.

A bit 15 of the read packet may be set to 0 for indicating a header, and since the read packet does not accompany a data payload, a bit 14 of the read packet may be set to 0.

Bits 23-16 of the read packet may be composed of a sequence number indicating a sequence of a header packet.

Bits 29-24 (RTAG) of the read packet are a field that designates a sequence of a read response packet desired to read. When a logical transmitter of a receiving side receives a read response packet, the logical transmitter may determine whether the received read response packet is a read response packet corresponding to the read packet.

Similarly to the writing packet, an address may be included in bits [63-6] of the read packet.

However, since the read packet does not need byte enable, the read packet may end with 0xFD which is a symbol indicating an end of a packet and CRC of 32 bits subsequent to an address field.

Similarly to the writing packet, when a logical channel of a transmitting side transmits the read header and then receives ACK, the logical channel may access a next packet.

Here, before the next packet is transmitted after transmitting the read header, a host logical transmitter may stand by until the read response packet is received.

As described above, according to an embodiment of the present invention, by waiting for reception of the read response packet before another packet is transmitted, data consistency is ensured.

As illustrated in FIG. 6B to FIG. 6E, a read response packet may have a format similar to that of a data payload of a writing packet.

Unlike the data payload of the writing packet, bits 21-16 of the read response packet may use an RTAG field instead of a PSEQ field. The RTAG field is a sequence for identifying the read response packet corresponding to the read packet, and an RTAG field of each read response packet may match an RTAG field of a received read header packet corresponding thereto.

For example, when the host transmission and reception apparatus 2200 transmits a read packet where RTAG is set to 5, the device transmission and reception apparatus 2300 may transmit a read response data packet where RTAG is set to 5. In this case, when the host transmission and reception apparatus 2200 normally receives the read response data packet where RTAG is set to 5, the host transmission and reception apparatus 2200 may transmit the response control packet illustrated in FIG. 5F.

In detail, when each logical channel of a receiving side receives a read response packet, each logical channel may check a CRC value of the read response packet to determine whether a normal read response packet is received. Therefore, by using a response control packet, each logical channel of the receiving side may inform the other side whether the read response packet is normally received as a result of check. In this case, by using an RTAG field, a logical channel of the other side may check which read response packet the response control packet corresponds to.

As described above, according to an embodiment of the present invention, a physical lane independently transmits and receives a packet, and thus, although an inter-lane alignment logic is provided in high speed serial communication using a multi-lane or a transmitter does not transmit a separate packet for inter-lane alignment, a packet where a skew occurs is restored.

Hereinafter, a packet transmission and reception method according to an embodiment of the present invention will be described in detail with reference to FIG. 7. FIG. 7 is a flowchart illustrating a packet transmission and reception method according to an embodiment of the present invention.

First, in step S710, a plurality of physical lanes may check a connection state with a plurality of other physical lanes. Here, when the plurality of physical lanes are a physical transmitter and a physical receiver of the host transmission and reception apparatus 2200, the plurality of other physical lanes may be a physical transmitter and a physical receiver of the device transmission and reception apparatus 2300. In detail, the plurality of physical lanes may transmit and receive a training sequence packet to and from another physical lane which is connected thereto through an external interface, thereby checking whether there are a plurality of other physical lanes connected thereto.

Subsequently, in step S720, the plurality of physical lanes may inform a plurality of logical lanes of the checked connection state. Here, each of the plurality of physical lanes may report the connection state to the plurality of logical lanes. Therefore, the plurality of logical lanes may check connection states of all the physical lanes.

In step S730, by using the connection state, each of the plurality of logical lanes may check a physical channel which transmits and receives a packet to and from the plurality of other logical lanes. In detail, each logical lane may check its own physical lane, which is capable of transmitting and receiving the packet to and from a logical lane corresponding thereto, and another physical lane which is connected to its own physical lane through an interface.

Subsequently, in step S740, each logical lane may transmit, through the checked physical channel, a flow control initialization packet to another logical lane corresponding thereto among the plurality of other logical lanes, thereby informing the other side of a capacity of a reception buffer.

In this case, each logical lane may also check a capacity of a reception buffer of the other side.

In step S750, each logical lane may transmit or receive a packet to or from another logical lane through the checked physical channel. In detail, each logical lane may transmit a writing packet and a read packet or receive a response control packet or a read response packet.

Moreover, when there is a physical lane, which is not connected to the plurality of other physical lanes or is inoperable, among the plurality of physical lanes as a check result of the physical channels, each logical lane may transmit or receive a packet through another physical channel except the inoperable physical lane.

Moreover, each logical lane may periodically inform a logical lane of the other side of the capacity of the reception buffer, may periodically receive a report on a capacity of a reception buffer of the other side from a logical lane of the other side, and may transmit and receive a packet in consideration of the capacity of the reception buffer when transmitting and receiving the packet.

Moreover, each logical lane may check a payload sequence from a data packet such as a writing packet or a read packet to check a header packet corresponding to a packet and a packet combined with the packet, and check a packet combination sequence. Therefore, each logical lane may restore the original packet according to the packet combination sequence.

Such a packet transmission and reception operation may be performed by another element of a host or a device in addition to each logical lane. The other element of each logical lane has been described above, and thus, its detailed description is not provided.

As described above, according to an embodiment of the present invention, by allowing a logical lane to be mapped to an arbitrary physical lane, a degree of coupling freedom between a logical lane and a physical lane increases, and arbitrary access between physical lanes is allowed, thereby enabling lanes to be efficiently used.

Moreover, according to an embodiment of the present invention, even when an error occurs in some physical lanes, other available physical lanes are used, and thus, availability is high. Particularly, the present invention is useful for a system requiring high availability.

According to the embodiments of the present invention, the packet transmission and reception system, apparatus, and method are suitable for data transmission and reception using a high speed multi-lane.

Figure 8:
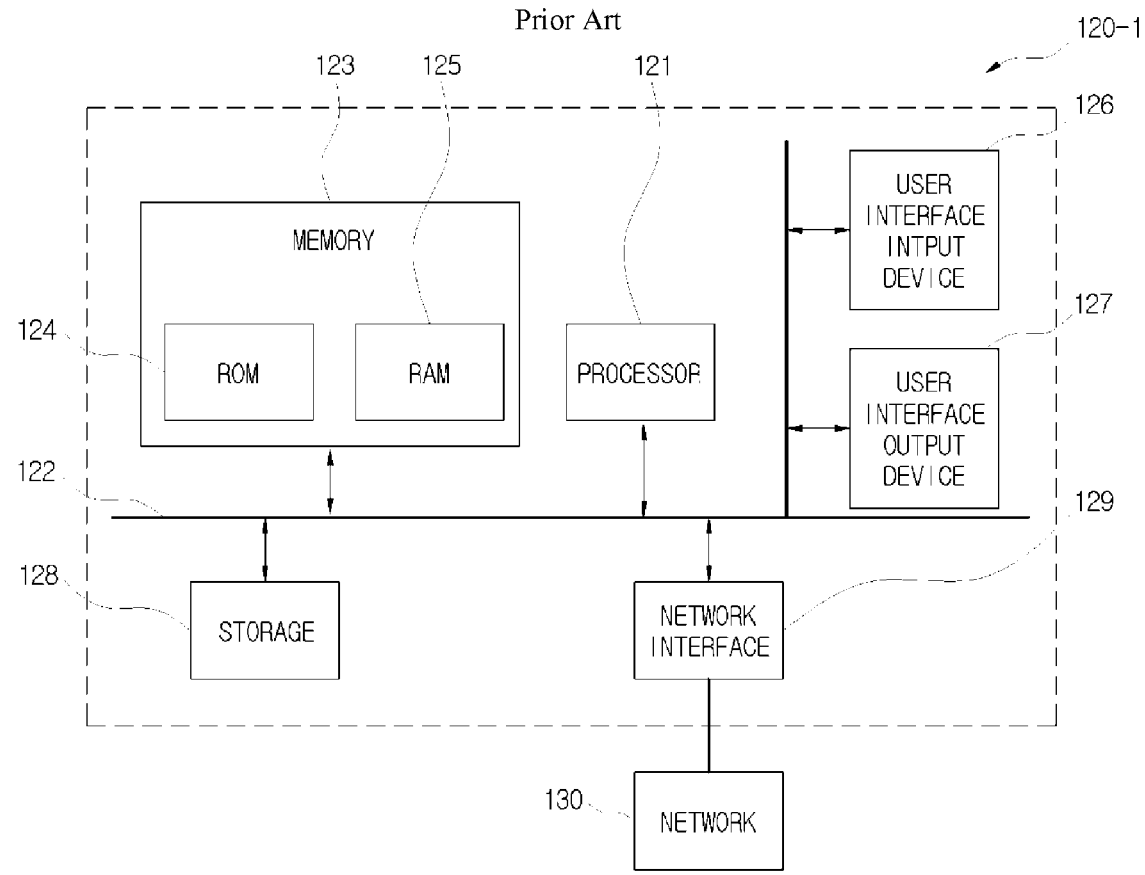
FIG. 8 is a block diagram illustrating a computer system to which the present invention is applied.

The packet transmission and reception method according to an embodiment of the present invention may be implemented in a computer system or may be recorded in a recording medium. As illustrated in FIG. 8, a computer system may include at least one processor 121, a memory 123, a user interface input device 126, a data communication bus 122, a user interface output device 127, and a storage 128. The components perform data communication via the data communication bus 122.

The computer system may further include a network interface 129 coupled to a network. The processor 121 may be a central processing unit (CPU) or a semiconductor device processing a command stored in the memory 123 and/or the storage 128.

The memory 123 and the storage 128 may include various types of volatile or nonvolatile storage mediums. For example, the memory 123 may include a ROM 124 and a RAM 125.

Thus, the packet transmission and reception method according to an embodiment of the present invention of the present invention may be implemented as a computer-executable method. When the packet transmission and reception method according to an embodiment of the present invention is performed in a computer device, computer-readable commands may perform the recognition method according to the present invention.

The packet transmission and reception method according to an embodiment of the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A packet transmission and reception system for distributing and transmitting data through a plurality of multi-lanes, the packet transmission and reception system comprising:
   a first transmission and reception apparatus configured to include a plurality of first physical lanes and a plurality of first logical lanes, each of the first logical lanes being connected to the plurality of first physical lanes; and
   a second transmission and reception apparatus configured to include a plurality of second physical lanes and a plurality of second logical lanes, each of the second logical lanes being connected to the plurality of second physical lanes,
   wherein the plurality of first physical lanes are respectively connected to the plurality of second physical lanes,
   wherein each of the plurality of first physical lanes checks a respectively connected second physical lane of the plurality of second physical lanes and informs the plurality of first logical lanes of information about the checked second physical lane, and
   wherein each of the plurality of first logical lanes checks, based on the information, a respective first physical lane and a respective second physical lane connected to a respective second logical lane of the plurality of second logical lanes, and respectively transmits or receives a data packet to or from the respective second logical lane through the checked respective first physical lane and the checked respective second physical lane.

2. The packet transmission and reception system of claim 1, wherein
   each of the plurality of first physical lanes and the plurality of second physical lanes comprises a physical transmitter and a physical receiver, and each of the plurality of first logical lanes and the plurality of second logical lanes comprises a logical transmitter and a logical receiver.

3. The packet transmission and reception system of claim 1, wherein the plurality of first logical lanes check the information, and before transmitting or receiving the data packet, the plurality of first logical lanes transmit a flow control packet, indicating a capacity of a transmission and reception buffer included in each of the plurality of first logical lanes, to the plurality of second logical lanes.

4. The packet transmission and reception system of claim 3, wherein the plurality of first logical lanes transmit a flow control update packet indicating the capacity of the transmission and reception buffer which has been changed after the flow control packet is transmitted.

5. The packet transmission and reception system of claim 1,
wherein each of the plurality of second physical lanes checks a respectively connected first physical lane of the plurality of first physical lanes and informs the plurality of second logical lanes of information about the checked first physical lane, and
wherein each of the plurality of second logical lanes autonomously checks, based on the information, a respective first physical lane connected to a respective first logical lane of the plurality of first logical lanes and a respective second physical lane, and respectively transmits or receives a data packet to or from the respective first logical lane through the autonomously checked respective first physical lane and the checked respective second physical lane.

6. The packet transmission and reception system of claim 1, wherein when a first physical lane which is not connected to one of the plurality of second physical lanes or is inoperable is checked from among the plurality of first physical lanes, the plurality of first logical lanes transmit or receive the data packet to or from the plurality of second logical lanes by using a first physical lane except the checked first physical lane.

7. The packet transmission and reception system of claim 1, wherein when the data packet distributed to and transmitted through the plurality of multi-lanes is received from the plurality of second logical lanes through at least one of the plurality of first physical lanes and at least one of the plurality of second physical lanes, the plurality of first logical lanes check a combination sequence of the data packet by using a payload sequence included in the data packet and combine a plurality of the data packets according to the combination sequence to restore original data.

8. The packet transmission and reception system of claim 1, wherein when the first transmission and reception apparatus is a host apparatus, the second transmission and reception apparatus is a device which is connected to the host apparatus through an external interface.

9. A packet transmission and reception apparatus for transmitting and receiving data to and from another apparatus connected to an external interface through a plurality of multi-lanes, the packet transmission and reception apparatus comprising:
a plurality of physical transmitters respectively connected to the plurality of multi-lanes;
a plurality of physical receivers respectively connected to the plurality of physical transmitters in a one-to-one correspondence relationship;
a plurality of logical transmitters having a number of logical transmitters equal to a number of the multi-lanes in the plurality of multi-lanes; and
a plurality of logical receivers respectively connected to the plurality of logical transmitters in a one-to-one correspondence relationship,
wherein when at least one of an inoperable physical transmitter and an inoperable physical receiver is checked from among the plurality of physical transmitters and the plurality of physical receivers, at least one of the plurality of logical transmitters and the plurality of logical receivers transmits or receives a data packet to or from the other apparatus by using another physical transmitter and another physical receiver except a physical transmitter and a physical receiver which correspond to the at least one of the inoperable physical transmitter and the inoperable physical receiver.

10. The packet transmission and reception apparatus of claim 9, wherein each of the plurality of logical receivers or a module which has received the data packet from the plurality of logical receivers checks a payload sequence included in the data packet to identify a header packet, corresponding to the data packet, and a packet combined with the data packet.

11. The packet transmission and reception apparatus of claim 9, wherein each of the plurality of logical receivers or a module which has received the data packet from the plurality of logical receivers checks a payload sequence of a data payload packet in the data packet to check a combination sequence of the data packet and a packet combined with the data packet, and combines the data packet with the combined packet according to the combination sequence.

12. The packet transmission and reception apparatus of claim 9, wherein the plurality of first logical transmitters transmit a flow control packet, indicating a capacity of a transmission and reception buffer included in each of the plurality of first logical transmitters, to the other apparatus at least once before transmitting or receiving the data packet.

13. The packet transmission and reception apparatus of claim 12, wherein the plurality of first logical transmitters transmit a flow control update packet indicating the capacity of the transmission and reception buffer which has been changed after the flow control packet is transmitted.

14. The packet transmission and reception apparatus of claim 9, wherein when the data packet is received, each of the plurality of logical receivers or a module which has received the data packet from the plurality of logical receivers performs cyclical redundancy check (CRC) to determine whether the data packet is a normal packet, and transmits an ACK or NAK packet to the other apparatus according to a result of the determination.

15. The packet transmission and reception apparatus of claim 9, wherein each of the plurality of physical receivers receives a training sequence packet from a plurality of other physical transmitters included in the other apparatus to initialize a physical channel relevant to each of the plurality of other physical transmitters, and transfers information of the initialized physical channel to the plurality of logical receivers.

16. The packet transmission and reception apparatus of claim 15, wherein the plurality of logical receivers receive information of the physical channel from the plurality of physical receivers to check a physical receiver of the physical channel corresponding to each of the plurality of logical receivers among the plurality of physical receivers, and transmit the data packet to a physical transmitter corresponding to the checked physical receiver, thereby transmitting the data packet to the plurality of logical receivers included in the other apparatus.

17. A packet transmission and reception method where a first transmission and reception apparatus including a plurality of physical lanes and a plurality of logical lanes transmits or receives a packet to or from a second transmission and reception apparatus including a plurality of other physical lanes and a plurality of other logical lanes, wherein each of the plurality of logical lanes being connected to the plurality of physical lanes, each of the plurality of other logical lanes being connected to the plurality of other physical lanes, and the plurality of physical lanes are respectively connected to the plurality of other physical lanes, the packet transmission and reception method comprising:

checking, by the plurality of physical lanes, a connection state with each of the plurality of other physical lanes;

informing, by the plurality of physical lanes, the plurality of logical lanes of the checked connection state;

checking, by each of the plurality of logical lanes, based on the connection state, a respective physical lane and a respective other physical lane connected to a respective other logical lane of the plurality of other logical lanes; and respectively transmitting or receiving, by each of the plurality of logical lanes, a packet to or from the respective other logical lane through the checked respective physical lane and the checked respective other physical lane, wherein each of the plurality of logical lanes and each of the plurality of other logical lanes store path information for transmitting the packet.

18. The packet transmission and reception method of claim 17, wherein when a physical lane which is not connected to one of the plurality of other physical lanes or is inoperable is checked from among the plurality of physical lanes in the checking of the physical channel, the receiving comprises transmitting or receiving the packet through the physical lane except the checked physical lane.

19. The packet transmission and reception method of claim 17, comprising, after the checking of the physical channel, by each of the plurality of logical lanes, transmitting information about a capacity of a reception buffer to other logical lane corresponding to each logical lane.

20. The packet transmission and reception method of claim 17, wherein the transmitting or receiving comprises checking a payload sequence included in a data packet in the packet to identify a header packet, corresponding to the data packet, and an other packet combined with the data packet.

\* \* \* \* \*